United States Patent
Mok et al.

(10) Patent No.: US 11,455,714 B2
(45) Date of Patent: Sep. 27, 2022

(54) MULTI-ACCESS EDGE COMPUTING METHODS AND SYSTEMS FOR COMPUTER-VISION-BASED PRODUCT COMPLIANCE VERIFICATION

(71) Applicant: Verizon Patent and Licensing Inc., Arlington, VA (US)

(72) Inventors: Aleo Nobel Mok, Orinda, CA (US); Sean Hsu, New York, NY (US); Christian Guirnalda, New Brunswick, NJ (US); Zachary Drossman, New York, NY (US); Joshua Christopher Ness, Brooklyn, NY (US); Khurram Nasir Gore, Staten Island, NY (US); Jessica Sobel, New York, NY (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 581 days.

(21) Appl. No.: 16/522,154

(22) Filed: Jul. 25, 2019

(65) Prior Publication Data
US 2021/0027452 A1 Jan. 28, 2021

(51) Int. Cl.
*G06T 7/00* (2017.01)
*G06Q 30/00* (2012.01)
*G06Q 10/08* (2012.01)
*G06T 7/70* (2017.01)
*G06Q 50/04* (2012.01)

(52) U.S. Cl.
CPC ........ *G06T 7/0004* (2013.01); *G06Q 10/087* (2013.01); *G06Q 30/018* (2013.01); *G06Q 50/04* (2013.01); *G06T 7/70* (2017.01); *G06T 2207/30108* (2013.01)

(58) Field of Classification Search
CPC ....... G06T 7/0004; G06T 7/70; G06Q 10/087; G06Q 30/018
See application file for complete search history.

(56) References Cited

U.S. PATENT DOCUMENTS

2018/0284091 A1* 10/2018 Levanon ................ G01K 13/10
2019/0213534 A1* 7/2019 Adato ................ G06Q 30/0639
2021/0099848 A1* 4/2021 Ruan ....................... H04W 4/40

* cited by examiner

*Primary Examiner* — Myron Wyche

(57) ABSTRACT

An exemplary computer vision system implemented by a multi-access edge computing ("MEC") server integrated within a provider network accesses an image captured by an image capture device coupled with the MEC server via the provider network. The image depicts a product that is to comply with a predefined product standard. The computer vision system identifies a criterion that is associated with the predefined product standard, and a region of the image that is associated with a product condition that is to be verified for compliance with the criterion. The computer vision system determines whether the product condition complies with the identified criterion for the identified region of the image, and, based on this determination, generates compliance verification data indicative of whether the product complies with the predefined product standard. The computer vision system also provides the compliance verification data to a monitoring system separate from the MEC server.

20 Claims, 10 Drawing Sheets

MULTI-ACCESS EDGE COMPUTING METHODS AND SYSTEMS FOR COMPUTER-VISION-BASED PRODUCT COMPLIANCE VERIFICATION

BACKGROUND INFORMATION

In various contexts and situations, product standards may be defined so that various types of products comply with the product standards in various different ways. As one example, a planogram (e.g., a particular diagram or model configured to increase shelf appeal of retail products to shoppers in a retail store) may be defined in such a way that retail products presented in a retail display are to be placed in accordance with parameters of the planogram. As another example, a product manufacturing standard (e.g., including parameters indicating manufacturing details and tolerances) may be defined such that products being manufactured (e.g., created, built, assembled, packaged, etc.) may comply with the product manufacturing standard if the products are free of manufacturing defects.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION OF PREFERRED EMBODIMENTS

Figure 1:
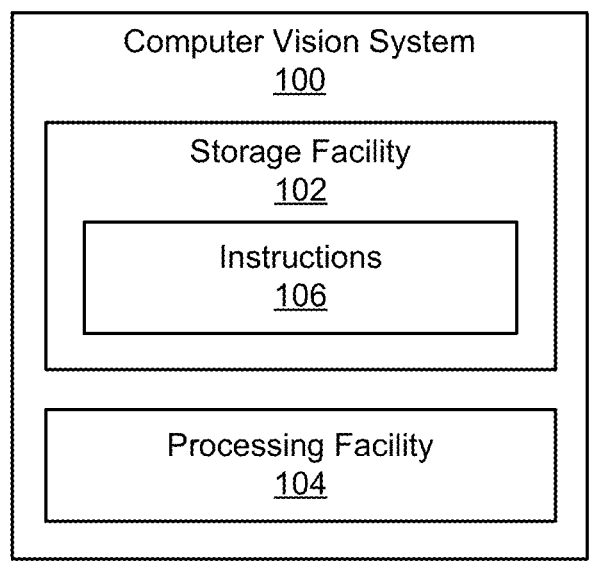
FIG. 1 illustrates an exemplary computer vision system for computer-vision-based product compliance verification according to principles described herein.

Multi-access edge computing methods and systems for computer-vision-based product compliance verification are described herein. For example, multi-access edge computing ("MEC") and/or other corresponding technologies (e.g., 5G network technologies) may be used to verify that planograms are implemented properly (i.e., that products are placed properly on product displays); that products being manufactured are created, assembled, and packaged without defects; and/or that products otherwise comply with other suitable types of product standards.

To implement computer-vision-based product compliance verification using MEC or other such technologies, an exemplary computer vision system may be implemented by a MEC server integrated within a provider network (e.g., a wireless communications network managed by a mobile network operator). The computer vision system may access an image captured by an image capture device. The image capture device may be communicatively coupled with the MEC server by way of the provider network and the image may depict a product that is to comply with a predefined product standard. As used herein, a predefined product standard may refer to a set of requirements, criteria, and/or other types of parameters defining an ideal to which a product or products are to conform and that is set by a party prior to product compliance verification. In some examples, as will be described in more detail below, a predefined product standard may include a reference image that depicts an ideal or desirable implementation of a product or products (e.g., a planogram, an image of a model product that has been manufactured in a desired way, etc.).

Along with accessing the image, the computer vision system may identify a criterion that is associated with the predefined product standard. For instance, if the predefined product standard includes a planogram, the criterion may be associated with a location and manner that a product depicted in the image is to be presented with respect to a product display. As another example, if the predefined product standard is a manufacturing standard, the criterion may be associated with a manufacturing parameter for a product (e.g., a requirement or tolerance level associated with manufacture of a particular aspect of the product). In addition to identifying the criterion, the computer vision system may also identify a region of the image that is associated with a product condition that is to be verified for compliance with the criterion. For example, the region may depict a portion of a product display where a planogram indicates that a particular product is to be presented, or the region may depict a portion of a product being manufactured in accordance with a particular manufacturing parameter.

Upon identifying the criterion and the region, the computer vision system may determine, for the identified region of the image, whether the product condition complies with the identified criterion. For instance, in the planogram example, the computer vision system may determine if the product is properly presented in the identified portion of the product display. In the manufacturing example, the computer vision system may determine if the portion of the product complies with the manufacturing parameters to be free of manufacturing defects or other such issues. Based on the determining of whether the product condition complies with the identified criterion, the computer vision system may generate compliance verification data indicative of whether the product complies with the predefined product standard and provide the compliance verification data to a monitoring system. The monitoring system may be separate from the MEC server and communicatively coupled to the MEC server by way of the provider network. For example, the monitoring system may be deployed at a retail store for use by workers responsible for stocking products and keeping product displays up to the standard, deployed on a factory floor for use by workers responsible for quality control of products being manufactured, or the like.

In certain embodiments, a computer vision system such as described above may interoperate with other separate systems and devices to implement the computer-vision-based product compliance verification operations described above. In other embodiments, a product compliance verification system may be configured to perform the operations independently, and may thus include a computer vision system as well as various other hardware and devices necessary to perform the operations. For example, a product compliance verification system may include an image capture device configured to capture an image depicting a product that is to comply with a predefined product standard, a monitoring system, and a MEC server separate from and communicatively coupled with the image capture device and the monitoring system. In this example, the MEC server may also be integrated within a provider network and may be configured to perform the same operations described above to be performed by the computer vision system. Specifically, the MEC server within this product compliance verification system may 1) access, from the image capture device, the image depicting the product that is to comply with the predefined product standard; 2) identify a criterion that is associated with the predefined product standard, and a region of the image that is associated with a particular product condition that is to be verified for compliance with the criterion; 3) determine, for the identified region of the image, whether the product condition complies with the identified criterion; 4) generate, based on the determining of whether the product condition complies with the identified criterion, compliance verification data indicative of whether the product complies with the predefined product standard; and 5) provide the compliance verification data to the monitoring system.

In some examples, the accessing and processing of the image to generate the compliance verification data, as well as the providing of the compliance verification data to the monitoring system, may be performed in real time as products are being manufactured, as shoppers are selecting products from product displays, and so forth. As mentioned above, this real-time performance may be accomplished by performing some or all of the operations described above on a MEC server that is configured to perform computing tasks using an arbitrary amount of parallel computing power so as to perform computing tasks with a very low latency to the monitoring system. As such, computer vision systems and product compliance verification systems described herein may provide live and up-to-date information about products that fail to comply with applicable standards even as products are dynamically moving and changing in the retail, manufacturing, or other environment where the product compliance verification is being performed.

Methods and systems for computer-vision-based product compliance verification described herein may also provide various other benefits. For example, as mentioned above, various benefits and advantages arise from automating product compliance verification (i.e., having the product compliance verification performed automatically by a computer vision system) rather than performing it manually (i.e., performed by human workers). For example, product compliance verification may be more reliable and consistent (i.e., by removing subjectivity) when performed by a computer vision system than by different human beings, each of whom may have different abilities to do the work, may exercise judgment differently, may have different tolerances for compliance issues, and so forth. Moreover, product compliance verification may be performed more accurately and efficiently by a computer vision system than by human operators, especially in high speed or rapidly changing environments, because every single product unit may be monitored in the same way (e.g., using the same algorithm, etc.) and at virtually all times (e.g., once per second or whatever time period is appropriate for a given implementation). In this way, product compliance issues may be discovered more accurately than when statistical sampling has to be relied on to verify product compliance for only certain (but not all) product units and/or to verify product compliance only periodically (e.g., once every few minutes, once an hour, etc.) rather than monitoring compliance at virtually all times.

Performing product compliance verification operations on a high-speed, low-latency MEC server deployed within a provider network such as a cellular network managed by a mobile network operator may also provide significant benefits and advantages when compared to automated product compliance verification operations performed using local computing resources. For example, because a MEC server may include shared resources that can be leveraged by multiple client systems (e.g., multiple stores performing planogram compliance checks, multiple manufacturing sites performing manufacturing compliance checks, etc.), it may be more efficient and economical to deploy large numbers of powerful computing resources at the MEC server than at a local computer that is located on-site (e.g., at a store or manufacturing site, etc.) and is used exclusively to perform product compliance verification for the single site. Accordingly, any attempt to deploy a local implementation of automated product compliance verification may be forced to make tradeoffs between performance and efficiency (e.g., computing efficiency, cost efficiency, etc.) that are not required by MEC-based methods and systems described herein. At the same time, local systems do not provide any significant performance advantages over the MEC-based systems described herein. For example, MEC-based systems for computer-vision-based product compliance verification described herein may provide compliance verification data with latency that is low enough to seem instantaneous to users so that product compliance verification issues may be discovered and resolved in real time. For this reason, a MEC-based system would also be advantageous over a cloud-based system for computer-vision-based product compliance verification (e.g., a multi-access server that is not integrated on the provider network but must be accessed by communicating outside of the provider network to a third party system via the Internet). A cloud-based system may be able to provide some of the advantages of parallelization of computing tasks, but may not be able to provide the low-latency advantages provided by MEC-based systems described above.

Various embodiments will now be described in more detail with reference to the figures. The disclosed systems and methods may provide one or more of the benefits mentioned above and/or various additional and/or alternative benefits that will be made apparent herein.

FIG. 1 illustrates an exemplary computer vision system 100 ("system 100") for computer-vision-based product compliance verification. System 100 may be implemented by a MEC server that is integrated within a provider network and that employs MEC technology, 5G network technologies, and/or other suitable technologies that may enable system 100 to perform the operations described herein. In certain examples, system 100 may be included together with other systems and/or devices (e.g., an image capture device, a monitoring device, etc.) within a product compliance verification system that is configured to operate as a single, independent system. In other examples, system 100 may be implemented separately and may operate independently from other systems and devices such as the image capture devices and/or the monitoring devices.

As shown, system 100 may include, without limitation, a storage facility 102 and a processing facility 104 selectively and communicatively coupled to one another. Facilities 102 and 104 may each include or be implemented by hardware and/or software components (e.g., processors, memories, communication interfaces, instructions stored in memory for execution by the processors, etc.). In some examples, facilities 102 and 104 may be distributed between multiple devices and/or multiple locations as may serve a particular implementation. For example, facilities 102 and 104 may be spread across multiple processors or other distinct computing resources within a MEC server, which, as will be described below, may incorporate a plurality of various different servers or other resources associated with a single MEC node. Each of facilities 102 and 104 within system 100 will now be described in more detail.

Storage facility 102 may maintain (e.g., store) executable data used by processing facility 104 to perform any of the functionality described herein. For example, storage facility 102 may store instructions 106 that may be executed by processing facility 104. Instructions 106 may be executed by processing facility 104 to perform any of the functionality described herein, and may be implemented by any suitable application, software, code, and/or other executable data instance. Additionally, storage facility 102 may also maintain any other data accessed, managed, used, and/or transmitted by processing facility 104 in a particular implementation.

Processing facility 104 may be configured to perform (e.g., execute instructions 106 stored in storage facility 102 to perform) various functions associated with computer-vision-based product compliance verification. For example, processing facility 104 may be configured to access (e.g., receive, input, load, etc.) an image captured by an image capture device communicatively coupled (e.g., by way of the provider network) with the MEC server implementing system 100. The image may depict a product that is to comply with a predefined product standard. Processing facility 104 may be further configured to identify a criterion that is associated with the predefined product standard, as well as a region of the image that is associated with a product condition that is to be verified for compliance with the criterion. As such, processing facility 104 may determine, for the identified region of the image, whether the product condition complies with the identified criterion, and may generate (e.g., based on the determining of whether the product condition complies with the identified criterion) compliance verification data indicative of whether the product complies with the predefined product standard. Processing facility 104 may also be configured to provide the compliance verification data to a monitoring system (e.g., a monitoring system separate from the MEC server and communicatively coupled to the MEC server by way of the provider network).

In some examples, system 100 may be configured to operate in real time so as to access and process the data described above (e.g., the image captured by the image capture device, the criteria associated with the predefined product standard, etc.) as quickly as the data is generated or otherwise becomes available. As a result, system 100 may perform computer-vision-based product compliance verification and provide compliance verification data to the monitoring system for presentation to a user within seconds, or even milliseconds, of when a product compliance verification issue occurs. As used herein, operations may be performed in "real time" when they are performed immediately and without undue delay. In some examples, real-time data processing operations may be performed in relation to data that is dynamic and time sensitive (i.e., data that becomes irrelevant after a short time) such as data representative of current conditions of a product undergoing manufacturing operations or the current condition of a product display in a retail store as shoppers select items for purchase and/or otherwise manipulate and interact with the products on the display. As such, real-time operations may be those operations that are performed while the information upon which the compliance verification data is based is still relevant.

Figure 2:
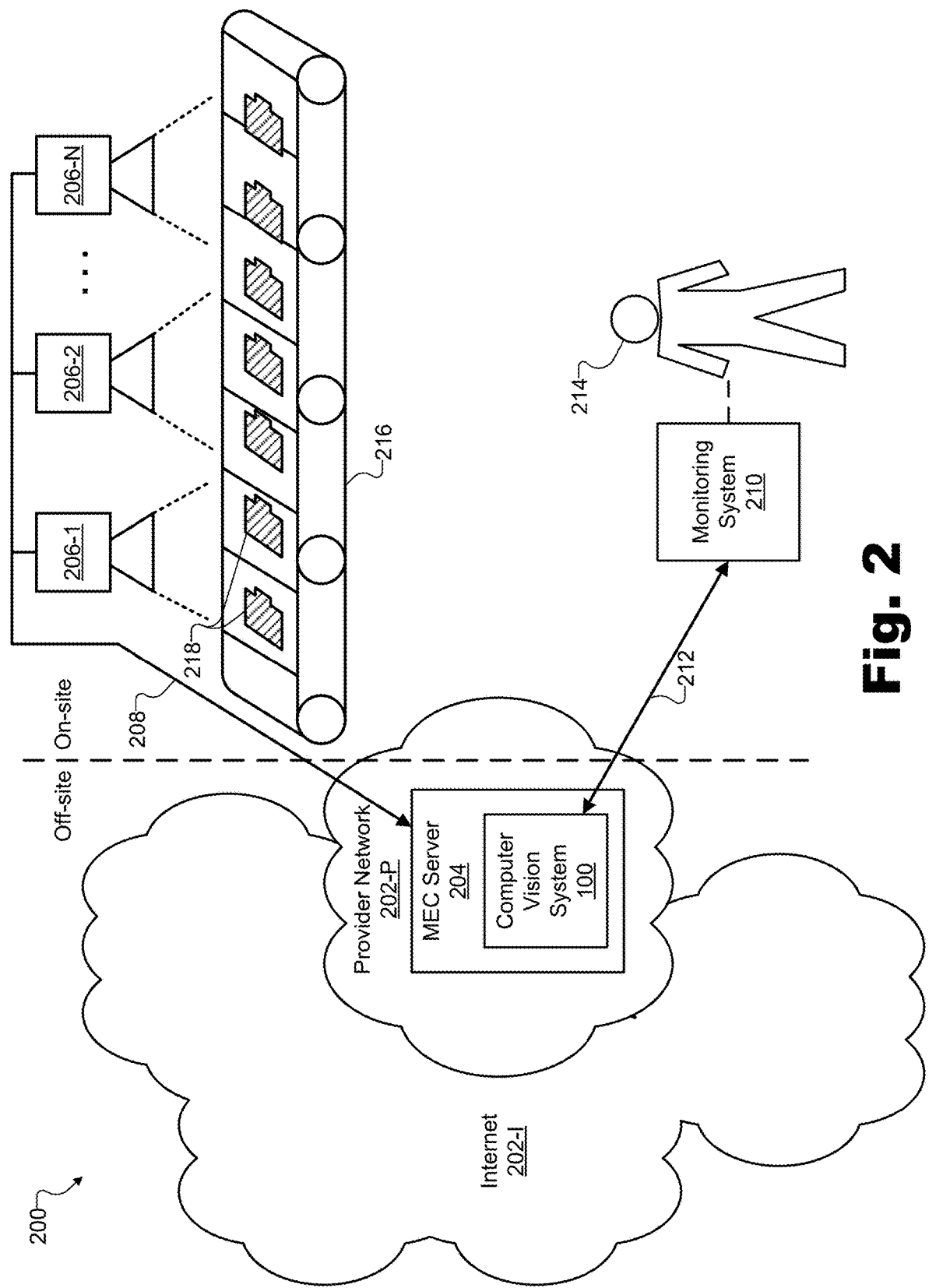
FIG. 2 illustrates an exemplary configuration within which the computer vision system of FIG. 1 may operate to perform computer-vision-based product compliance verification using a manufacturing standard for products being manufactured according to principles described herein.
Figure 3:
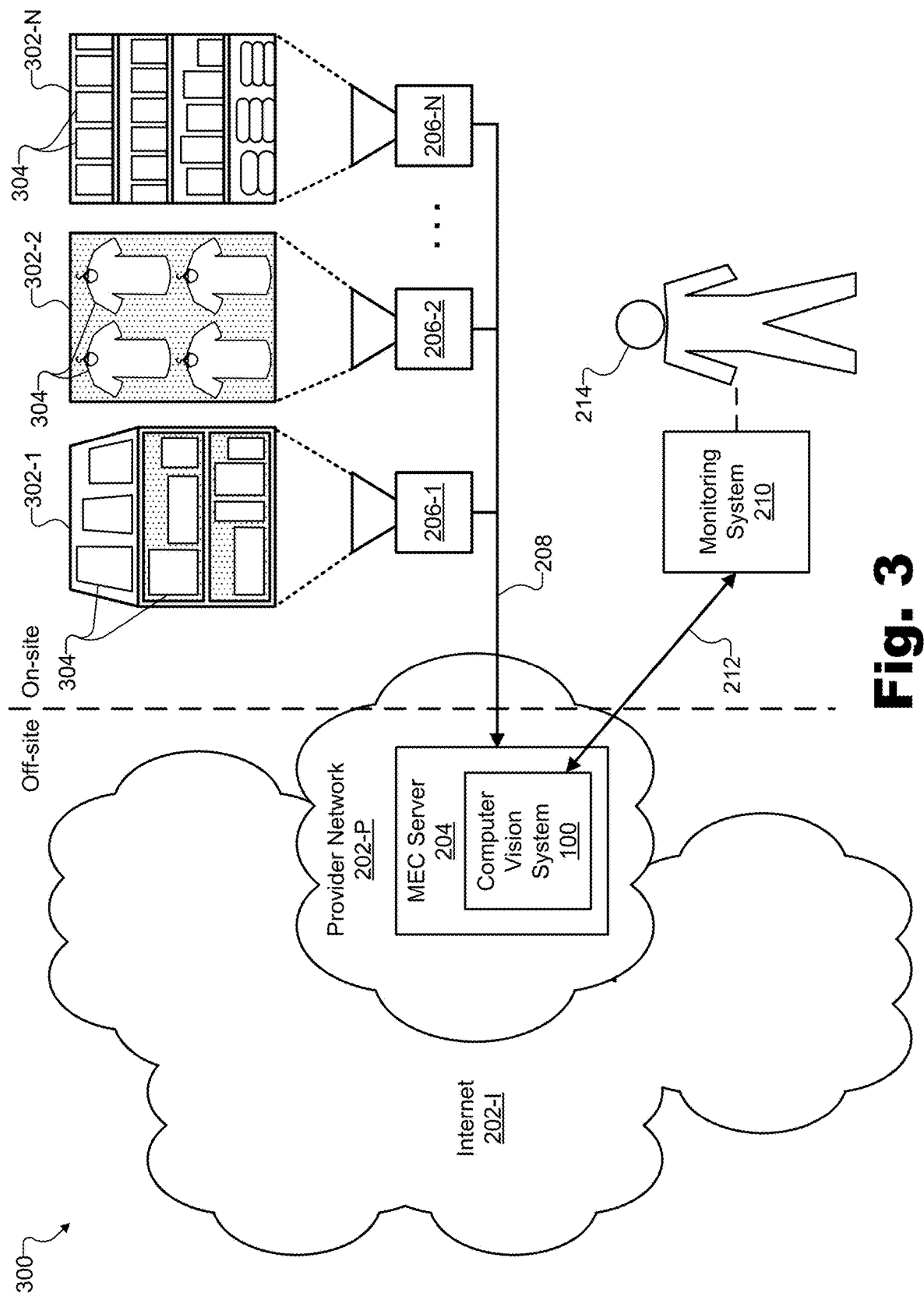
FIG. 3 illustrates an exemplary configuration within which the computer vision system of FIG. 1 may operate to perform computer-vision-based product compliance verification using a planogram defining proper presentation of products in a product display according to principles described herein.

System 100 may be used in various ways to perform computer-vision-based product compliance verification for various types of products in various scenarios and contexts. For example, FIG. 2 shows an exemplary configuration 200 within which system 100 may operate to perform computer-vision-based product compliance verification using a manufacturing standard for products being manufactured, while FIG. 3 shows an exemplary configuration 300 within which system 100 may operate to perform computer-vision-based product compliance verification using a planogram defining proper presentation of products in a product display. As shown, both configurations 200 and 300 include a network 202 (including a provider network 202-P portion and an Internet 202-I portion) and a MEC server 204 implementing system 100 and integrated within provider network 202-P. MEC server 204 is shown to be located "off-site" (i.e., distributed beyond or outside of the manufacturing site, retail site, or other site where the products and other components are located). Both configurations 200 and 300 also include an "on-site" set of image capture devices 206 (e.g., image capture devices 206-1 through 206-N) that is connected to MEC server 204 by way of a connection 208 and an on-site monitoring system 210 connected to system 100 by way of a connection 212. A worker 214 associated with monitoring system 210 (e.g., a user making use of monitoring system 210 and the compliance verification data provided thereby) is also shown to be on-site with monitoring system 210. Worker 214 may be responsible for handling compliance issues that are discovered with the products in any of the ways described herein. As such, it will be understood that worker 214 and monitoring system 210 (which may be a mobile device carried by worker 214 in certain implementations) may either be located on-site with the products, or may be off-site but in a position to still handle (directly or indirectly) any compliance issues that may be discovered (e.g., by directly handling the issues when coming on-site after a commute or after returning from a lunch break or the like, by indirectly handling the issues by directing on-site workers to handle the compliance issues, etc.).

Each of configurations 200 and 300 also include on-site products being verified for product compliance by system 100, but the products in the example of configuration 200 in FIG. 2 are different from those in the example of configuration 300 in FIG. 3. Specifically, configuration 200 in FIG. 2 is shown to be a manufacturing configuration with a manufacturing line 216 (illustrated as a conveyor belt in FIG. 2) along which a plurality of products 218 progress as the products pass through various manufacturing stages (e.g., creation, assembly, packaging, preparing for shipment, etc.). Configuration 300 in FIG. 3 is shown to be a product display configuration with several different product displays 302 (e.g., product displays 302-1 through 302-N) within which a plurality of products 304 are presented in accordance with respective planograms as shoppers browse and select items for purchase. While not explicitly shown or described herein, it will be understood that other exemplary configurations within which products (or portions thereof) may be verified for product compliance may also be implemented in accordance with principles described herein. Each of the components of configurations 200 and 300 will now be described in more detail.

Network 202 may be made up of two distinct portions. First, a provider network 202-P portion may be implemented by a provider-specific wired or wireless communications network (e.g., a cellular network used for mobile phone and data communications, a 5G network or network of another suitable technology generation, a cable or satellite carrier network, a mobile telephone network, a traditional telephone network, etc.), and may be operated and managed by a provider entity such as a mobile network operator (e.g., a wireless service provider, a wireless carrier, a cellular company, etc.). The provider of provider network 202-P may own or control all of the elements necessary to sell and deliver communications services to user 214, including radio spectrum allocation, wireless network infrastructure, back haul infrastructure, customer care, provisioning of devices, network repair for provider network 202-P, and so forth. In contrast, a second portion of network 202 referred to as Internet 202-I may include any interconnected network infrastructure that is outside of provider network 202-P and outside of the control of the provider. For example, Internet 202-I may include the Internet, a wide area network, a content delivery network, and/or any other suitable network or networks managed by any third parties outside of the control of the provider of provider network 202-P. Network 202 may provide data delivery between server-side provider systems (internal or external to provider network 202-P but not explicitly shown in FIG. 2 or 3) and client-side systems and devices such as image capture devices 206 and/or monitoring system 210. To this end, network 202 may implement or employ any suitable communication technologies, devices, media, protocols, or the like as may serve a particular implementation.

As shown, MEC server 204 may be integrated within provider network 202-P (e.g., deployed on provider network 202-P as an edge node on the network so as to communicate with devices and systems connected to provider network 202-P with low latency). For example, if provider network 202-P includes or is implemented by 5G network technology, MEC server 204 may include or be implemented as a 5G node in a fixed 5G deployment, a mobile 5G deployment (e.g., a network on wheels), or another suitable deployment.

As illustrated in configurations 200 and 300 by the depiction of MEC server 204 on the edge of provider network 202-P, MEC server 204 may be implemented as part of provider network 202-P and, hence, may be separate from other components such as image capture devices 206 and monitoring system 210. MEC server 204 may also be differentiated from computing resources deployed outside of provider network 202-P. For example, cloud computing nodes (not explicitly shown in FIG. 2 or 3) may be available for processing client data such as data for image capture devices 206 and/or monitoring system 210, but these cloud nodes may be operated by third parties other than the provider of provider network 202-P. As such, communication with such cloud computing nodes may be performed only by way of provider network 202-P and Internet 202-I, rather than just by way of provider network 202-P, potentially adding significant latency as compared to the latency achieved with communications to MEC server 204 directly by way of provider network 202-P. Accordingly, while system 100 may be implemented by such a cloud computing node in certain implementations, it will be understood that the benefits described herein of low-latency computer-vision-based product compliance verification are most pronounced when system 100 is implemented at the edge of provider network 202-P by MEC server 204.

In some examples, MEC server 204 may employ a significant amount of computing power (e.g., significantly more computing resources than may be practical to locally deploy at a manufacturing site of manufacturing line 216, at a retail site of product displays 302, or the like). For instance, MEC server 204 may include a plurality of parallel processors (e.g., central processing units ("CPUs"), graphics processing units ("GPUs"), etc.) for efficiently performing various processing-intensive operations that may be performed by system 100 and other systems served by MEC server 204.

MEC server 204 may include one or more servers and/or other suitable computing systems or resources all associated with a MEC node on provider network 202-P. As such, MEC server 204 may interoperate with image capture devices 206 and/or monitoring system 210 with a low enough latency to allow for the real-time operations described herein. MEC server 204 may leverage MEC technologies to enable multiple-access distributed computing capabilities at the edge of provider network 202-P. Accordingly, as a multiple-access distributed computing node, it will be understood that MEC server 204 may be configured to provide distributed computing services for client systems and devices (e.g., image capture devices 206, monitoring systems 210, other devices and systems unrelated to product compliance verification, etc.) at multiple sites such as multiple manufacturing sites, multiple retail stores, or the like. In this way, MEC server 204 contrasts with conventional on-site computing nodes for computer-vision-based product compliance verification that are configured only to provide service to client systems at the same site.

Image capture devices 206 may each represent a device capable of capturing an image and providing data representative of the image directly or indirectly to system 100. For example, each image capture device 206 may be implemented as a photo camera, a video camera, an infrared sensor device, a depth capture device, a 3D image capture device, or any other suitable imaging device as may serve a particular implementation. In some examples, each of image capture devices 206 may be implemented by the same type of capture device, while in other examples, different image capture devices 206 may be implemented by different types of capture devices. As will be described in more detail below, certain image capture devices 206 may be implemented as WiFi-enabled capture devices configured to provide image data to a customer premises equipment ("CPE")

device or other network device that aggregates data from a local area network and communicates with MEC server 204 on behalf of all the devices on the local area network. In contrast, other image capture devices 206 may be implemented as network capture devices (e.g., 5G capture devices) configured to communicate directly and independently with MEC server 204 without an intermediate connection to a CPE device or the like.

In configuration 200, image capture devices 206 are illustrated as capturing images at different points on a single manufacturing line 216. For example, one image capture device 206 (e.g., image capture device 206-1) may capture images of products 218, which may represent any type of product undergoing a manufacturing process (e.g., food products, textile products, electronics products, etc.), at an early point in the manufacturing process (e.g., when one portion of the product is complete but other portions of the product are not yet created or fully assembled). Different image capture devices 206 (e.g., image capture devices 206-2 through 206-N) may then capture images of products 218 at later points in the manufacturing process (e.g., when other portions of the products are completed, when the products are fully assembled, when the products are packaged, when the products are fully prepared for shipping, etc.). While a single manufacturing line 216 is illustrated in configuration 200, it will be understood that various capture devices 206 may be setup to capture images from various manufacturing lines at a single manufacturing site or to capture images from multiple manufacturing lines at a plurality of different manufacturing sites in various different geographical locations.

Similarly, in configuration 300, image capture devices 206 are illustrated as capturing images of different product displays 302 presenting products 304 that have already been manufactured and are now being offered for sale. For example, in this case, image capture device 206-1 is shown to capture images of product display 302-1, which presents products 304 that may represent electronics products (e.g., cell phones, tablet devices, electronic readers, etc.). Image capture device 206-2 is shown to capture images of product display 302-2, which presents products 304 that may represent clothing products (e.g., shirts or other suitable clothing items). Image capture device 206-N is shown to capture images of product display 302-N, which presents products 304 that may represent food products (e.g., canned goods, boxes of cereal, bags of sugar, etc.). While a few discrete product displays 302 associated with different types of products are shown in configuration 300, it will be understood that various other capture devices 206 may be setup to capture images from various other product displays at a single retail site (e.g., store) or to capture images from multiple product displays at a plurality of retail sites in various different geographical locations.

Connection 208 may represent any direct or indirect communicative coupling between image capture devices 206 and MEC server 204 by way of provider network 202-P as may serve a particular implementation. For example, as mentioned above, in certain implementations, each image capture device 206 may be implemented as a network capture device such as a 5G-enabled image capture device that includes wireless transceivers allowing for direct communication with MEC server 204. In this case, connection 208 may represent direct wireless communications between image capture devices 206 and MEC server 204. As further mentioned above, in other implementations, each image capture device 206 may be implemented as a Wi-Fi or other type of capture device that is not configured to communicate directly with MEC server 204, but rather is communicatively coupled to the server via a CPE device (e.g., a wireless router configured to connect to MEC server 204, etc.). In this case, connection 208 may represent the full extent of all the wired and/or wireless communications between image capture devices 206 and the CPE device(s) (not explicitly shown) and between the CPE device(s) and MEC server 204, as well as any other intermediate communications as may be involved in a particular implementation. Executing on resources of MEC server 204, system 100 may access images captured by image capture devices 206 in any suitable way, such as by requesting and receiving the images, having the images pushed up to system 100 automatically (without a request), or in any other manner as may serve a particular implementation.

System 100 may access images from image capture devices 206 by way of connection 208, and, as described above in relation to FIG. 1, may determine whether various product conditions comply with various criteria of a predefined product standard. Additional examples of product conditions and predefined product standard will be described in more detail below in relation to FIGS. 7 and 8. Once system 100 has verified whether products 218 and/or 304 are properly complying with applicable predefined product standards (e.g., manufacturing standards in the case of products 218, planogram standards in the case of products 304, etc.), system 100 may generate compliance verification data and provide the compliance verification data to monitoring system 210 by way of provider network 202-P over connection 212.

Compliance verification data may refer to any data representative of whether a product is in compliance with a predefined product standard such as a manufacturing standard, a planogram for a product display, or the like. For instance, compliance verification data may indicate that a product has been determined to be free of defect, may indicate that a product has been determined to have a defect, may represent details related to a defect that has been detected (e.g., including the nature of the defect, where the defect is, etc.), or may otherwise provide useful information about how a product satisfies and/or fails to satisfy various criteria of a manufacturing standard. As another example, compliance verification data may indicate that a particular product or product display is properly implementing a planogram standard, may indicate that a product is out of place on a product display, may represent details related to how the product is out of place (e.g., which product is in the wrong place, which product should be in a particular place instead, where a particular product should be placed instead of where it currently is, which product is absent from an expected location, etc.). Compliance verification data may be generated by system 100 based on the determining of whether various product conditions comply with various identified criteria, as will be described in more detail below. For example, system 100 may accumulate information from various verification tests associated with various product conditions and criteria of a predefined product standard, and may generate high level data representative of entire products or groups of products (e.g., products in a single product display) and whether they comply with applicable predefined product standards. In some examples, compliance verification data may also represent other information of interest such as historical compliance data associated with a particular manufacturing line or product display.

As shown, just as image capture devices 206 are located on-site with the products (e.g., products 218 or 304), thereby being separate from MEC server 204 and the implementation of system 100 implemented thereon, monitoring system 210 is also shown to be located on-site and to be separate from and communicatively coupled to the off-site MEC server 204. As such, connection 212 may represent any suitable connection by way of provider network 202-P (e.g., either a direct or indirect connection that includes additional components not explicitly shown) that is capable of delivering communications between MEC server 204 and monitoring system 210, including by transmitting compliance verification data from system 100 to monitoring system 210. In some examples, connection 212 may implement a real-time notification connection mechanism (e.g., a 5G notification connection mechanism) including, for instance, WebSocket, SSE, long polling, and/or any other such technologies or cloud-based notification web services as may serve a particular implementation.

Monitoring system 210 may be implemented as any device or other type of system that may facilitate worker 214 in monitoring on-site product compliance of products as the product compliance is continuously verified using system 100. For example, monitoring system 210 may be implemented as any type of system that may receive and process compliance verification data and indicate to worker 214 whether product compliance issues have been detected. In this way, worker 214 may address such issues immediately or within an appropriate amount of time. For example, worker 214 may work on the manufacturing floor and may receive a notification from monitoring system 210 that a particular product 218 has been detected to have a significant manufacturing defect that needs to be addressed (e.g., by removing the product 218 from the manufacturing line for manual repair, to be discarded rather than shipped or sold, etc.). As another example, worker 214 may work in a retail store and may receive a notification from monitoring system 210 that a particular product 304 has been detected to be improperly located, situated, oriented, or otherwise misplaced within one of product displays 302. Having received this notification, worker 214 may take action to correct the issue (e.g., by restocking the product 304, by moving the product 304 to its proper location, by adjusting the orientation of the product 304, etc.).

Figure 4:
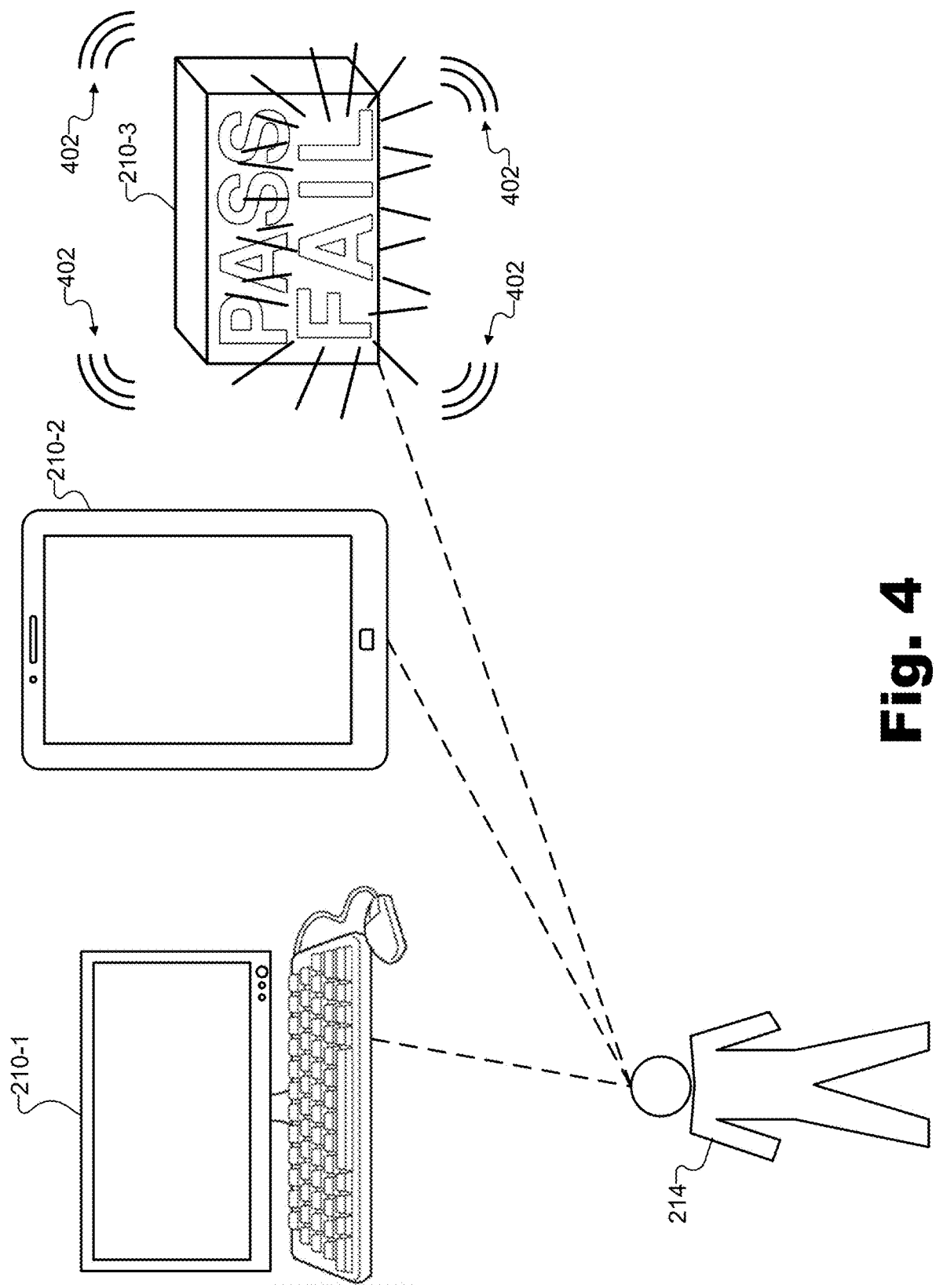
FIG. 4 illustrates several exemplary monitoring systems configured to present compliance verification data to a user according to principles described herein.

FIG. 4 illustrates several exemplary monitoring systems 210 (e.g., monitoring systems labeled 210-1, 210-2, and 210-3) that may be configured to present compliance verification data to worker 214 in different ways. It will be understood that one or more monitoring systems 210 such as the systems shown in FIG. 4 and/or other suitable types of monitoring systems may be employed as may serve a particular implementation. As shown in FIG. 4, in some implementations, a monitoring system 210 may be implemented by a relatively complex device capable of presenting a comprehensive user interface. For example, monitoring system 210-1 is shown to be implemented by a desktop or laptop computer system with a relatively large display screen that can show various customizable aspects of a compliance verification data dashboard that will be described below, and that can accept various types of user input such as keyboard input, mouse input, touchscreen input, or the like. For example, monitoring system 210-1 may execute a standalone application or web application configured to present a compliance verification data dashboard presenting any of the compliance verification data described herein.

Similarly, monitoring system 210-2 is shown to be implemented by a tablet device, smartphone, or other mobile device with a relatively large display screen (although perhaps not as large as the display screen of monitoring system 210-1) that can show similar aspects of the compliance verification data dashboard as monitoring system 210-1. Monitoring system 210-2 may execute a mobile application or web application configured to present compliance verification data in any suitable way such as by presenting a compliance verification data dashboard similar to a dashboard displayed by monitoring system 210-1.

A compliance verification data dashboard may be configured to present, to worker 214, any suitable compliance verification data (e.g., real-time data, historical data, predicted data, etc.) as may serve a particular implementation. For example, using a touchscreen interface or a point-and-click interface, worker 214 may touch or click to direct the particular monitoring system 210 to present various types of real-time and historical compliance verification data (e.g., presented in textual format or by graphical means such as graphs, charts, etc.). Worker 214 may also use the monitoring system 210 to explore trends, to view photographs of defects or placement violations, to view photographs of predefined product standards, to determine where an issue has been found, to determine what needs to be done to address an issue (e.g., to determine if an issue is fixable or if a product should be destroyed), or the like. More specifically, if monitoring system 210 is being used to monitor product displays to verify compliance with a planogram, a customizable dashboard presented on monitoring system 210-1 or 210-2 may be configured to pinpoint exact times and locations of compliance-related issues, along with product information and store metrics. As a result, a front-line employee such as worker 214 may be able to address planogram non-compliance issues within an appropriate amount of time and performance metrics may be aggregated across multiple retails sites (e.g., across multiple stores). As another example, if monitoring system 210 is being used to monitor items being manufactured on a manufacturing line to verify compliance with manufacturing parameters, a customizable dashboard presented on monitoring system 210-1 or 210-2 may pinpoint the exact times and locations of identified defects, along with station information and metrics. As a result, assembly workers such as worker 214 may be able to resolve individual defects without interrupting the production line, and may also address production equipment and/or asset deterioration in a timely manner.

In certain implementations, rather than a relatively complex device such as one of monitoring systems 210-1 or 210-2, a monitoring system may instead be implemented by a relatively simple device that provides minimal output and accepts minimal or no user input. For example, FIG. 4 shows an exemplary monitoring system 210-3 that is implemented as a simple sign configured to indicate "Pass" or "Fail" based on, for instance, whether a particular product being manufactured has been determined to be free of defects at a particular stage, whether a particular product display fully conforms to a corresponding planogram, or the like. In addition to, or as an alternative to, this visual indication of whether product compliance has been verified, such a monitoring system 210 may also present sounds 402 to further indicate product compliance or lack thereof. For example, a ding sound may be used to indicate that product compliance has been detected, while a buzzer sound may be used to indicate that a product compliance issue has been found.

As described above and illustrated in FIGS. 2 and 3, image capture devices 206 may each provide images over connection 208, and system 100 may analyze the images to generate compliance verification data that is provided to monitoring system 210. When captured, these images may be "raw" in the sense that certain preprocessing may be required to physically and/or photometrically align the images in preparation for analyzing the images against predefined product standards, which may include reference images (e.g., ideal or "golden" images) that the captured images should emulate if the product, products, or portions thereof depicted in the captured images comply with the predefined product standard. Accordingly, prior to comparing the captured images to the reference images of the predefined product standard or otherwise analyzing the captured images, system 100 may be configured to perform certain preprocessing operations on the raw images.

As one example of such image preprocessing (that may be done prior to the determining of whether the product condition complies with the identified criterion), system 100 may perform one or more image alignment operations with respect to the image. Specifically, the one or more image alignment operations may be configured to align the image for an application of the identified criterion associated with the predefined product standard.

Figure 5:
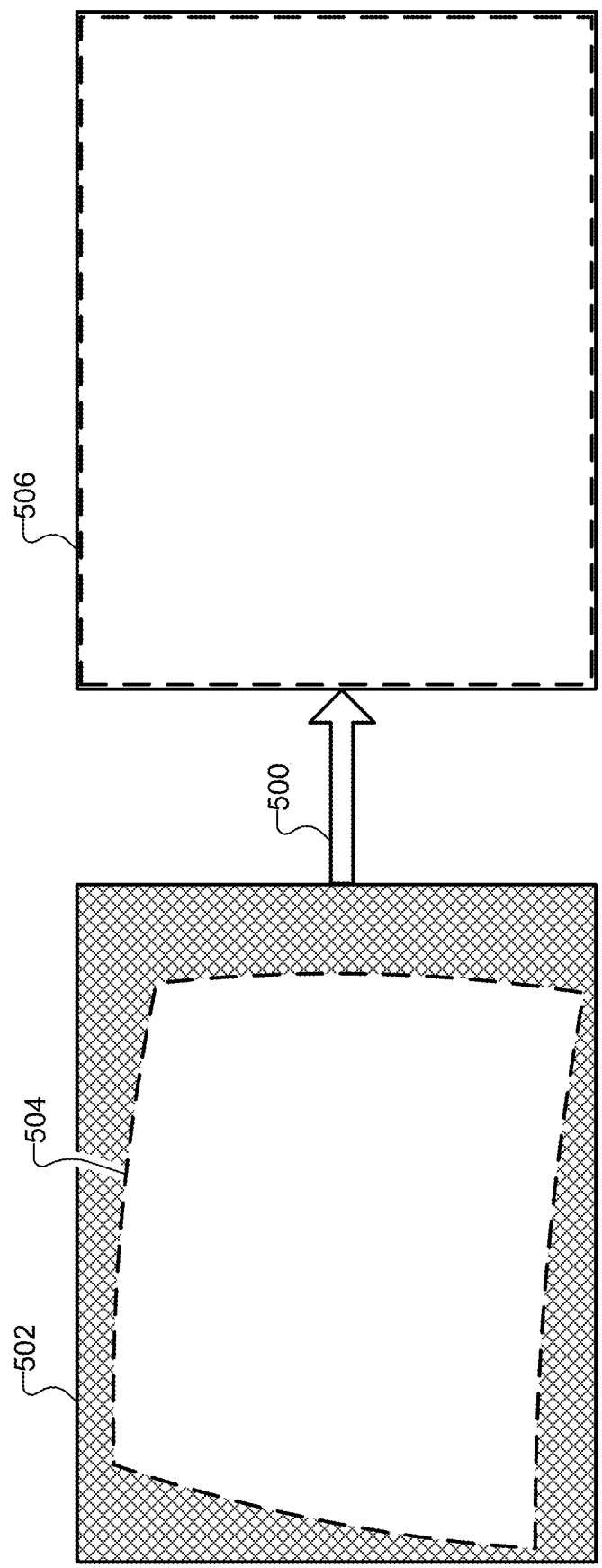
FIG. 5 illustrates an exemplary image alignment performed using a plurality of image alignment operations according to principles described herein.

To illustrate, FIG. 5 illustrates an exemplary image alignment 500 performed using a plurality of image alignment operations. As shown, a raw image 502 may include a portion 504 that is the portion actually depicting content that correlates with a reference image included within a predefined product standard (e.g., depicting the product display, depicting the product being manufactured or a relevant portion thereof, etc.). Raw image 502 may represent any suitable image such as a photograph captured by a camera capture device or a frame of video captured by a video capture device. In some examples, raw image 502 may be a high definition image including millions of pixels that require significant processing capabilities to process in real time (e.g., processing capabilities that may be found in a MEC server such as MEC server 204 but that may not be practical to deploy in a dedicated, local product compliance verification system that is located on-site with the products being verified). In certain examples, raw image 502 may be composed of a plurality of separately captured images (e.g., images captured by different image capture devices or separate capture elements of a single image capture device) that have been stitched together or are to be stitched together by system 100. While shown as a blank box in FIG. 5 for simplicity, it will be understood that raw image 502 may depict a product, a portion of a product (e.g., zoomed in to show a close-up image of a particular portion), or a plurality of products (e.g., arranged in a product display or the like).

Outside of portion 504, the rest of raw image 502 may be contextual or background content that does not correlate with the reference image included within the predefined product standard and may thus be discarded (e.g., trimmed away). By performing various image alignment operations, system 100 may accomplish image alignment 500 to produce an aligned image 506 that is prepared to be further analyzed and processed as will be described in more detail below.

Various types of image alignment operations may be employed in the performance of image alignment 500 to generate aligned image 506 from raw image 502. For example, system 100 may perform image alignment operations including one or more of a lateral translation alignment operation, a zoom translation alignment operation, a rotational translation alignment operation, a geometric transformation alignment operation, and/or any other alignment operation as may serve a particular implementation.

A lateral translation alignment operation may be used to crop away unneeded portions of a raw image on the top, bottom, or sides of the raw image to effectively move the relevant portion laterally to the center of the resulting image. For example, as shown in FIG. 5, portion 504 is shown to be situated somewhat toward the bottom left corner of raw image 502, such that there is more unneeded content (i.e., the content shaded in raw image 502) along the top and the right-hand side of raw image 502 than along the bottom and the left-hand side. The lateral translation alignment operation may crop away the appropriate amount of unneeded content along each edge of raw image 502 so that portion 504 is centered within the resulting image.

A rotational translation alignment operation may be used to rotate a particular portion of interest with respect to the sides of the raw image. For example, as shown in FIG. 5, portion 504 is shown to be rotated slightly clockwise with respect to the edges of raw image 502, such that a slight counterclockwise rotation will cause portion 504 to be more squarely framed. The rotational translation alignment operation may thus rotate portion 504 to fit squarely within the resulting image.

A zoom translation alignment operation may be used to zoom in on a particular portion of interest. For example, after the shaded portions along the top, bottom, and sides of raw image 502 are cropped away and portion 504 is rotated appropriately, a zoom translation alignment operation may be performed to enlarge (i.e., zoom into) portion 504 such that portion 504 essentially fills the resulting image (e.g., a resulting image that is the same size or resolution as the original raw image).

Even once lateral, rotational, and zoom translation alignment operations have been performed, portion 504 may not yet be fully aligned with a reference image included in a predefined product standard. This is because portion 504 may be captured from a different angle than the reference image and/or because optical distortion effects may be imposed by the image capture device capturing raw image 502 (e.g., from lens distortion of the image capture device, etc.). Accordingly, the image alignment operations included within image alignment 500 may also include a geometric transformation operation that undistorts the portion 504 and otherwise transforms portion 504 to fully fill aligned image 506, as shown in FIG. 5.

Image alignment 500 (including the image alignment operations described above) of a captured raw image to a given reference image included within a predefined product standard may be performed in any suitable way. In some examples, for instance, feature keypoints and descriptors may be extracted from both the reference image and from raw image 502. Matches between the two images may be determined (e.g., using Fast Library for Approximate Nearest Neighbors ("FLANN") and ratio test filtering or other suitable technologies) in order to identify viable feature pairs. From these matched pairs, a homography between the image may be determined (e.g., using random sample consensus ("RANSAC") or other suitable technologies), which is then used to geometrically transform raw image 502 into the perspective of the reference image (i.e., to generate aligned image 506). Along with associated cropping, this transformation (which may include zooming, rotating, undistorting, etc.) may allow for analogous portions of raw image 502 and the reference image of the predefined product standard to be compared, as will be described in more detail below.

As another example of image preprocessing that may be performed in certain implementations, it may be desirable to ensure that a raw or aligned image is suitable for analyzing before comparing the image to a reference image of a predefined product standard. For example, if an image is expected to depict a product being manufactured (e.g., at a particular point as the product is progressing along a manufacturing line), it may be desirable to ensure that the product is properly framed in the image, that the product is not moving (e.g., still coming into frame from an earlier point on the manufacturing line), and that the image does not depict any occluding object (e.g., a worker's hand, etc.) blocking or otherwise interfering with a part of the product that is to be verified for compliance. As another example, if an image is expected to depict a product display presenting various products in accordance with a predefined planogram, it may be desirable to ensure that no occluding object (e.g., a shopper standing in front of the product display to browse the products included thereon, a worker restocking the product display, etc.) is present to interfere with (e.g., block the view of, cast a shadow upon, etc.) any part of the product display that is to be verified for compliance.

To this end, along with performing an image alignment such as image alignment 500 prior to the determining of whether product conditions comply with identified criteria, system 100 may also perform an occlusion check with respect to the image (e.g., with respect to either raw image 502 or aligned image 506, depending on the order these operations are performed in a particular implementation). Specifically, the occlusion check may be configured to ensure that no occluding object (e.g., a person, a hand, a shopping cart, a piece of manufacturing equipment, etc.) is interfering with a depiction of the product condition in a region of the image that is to be verified for compliance.

Figure 6:
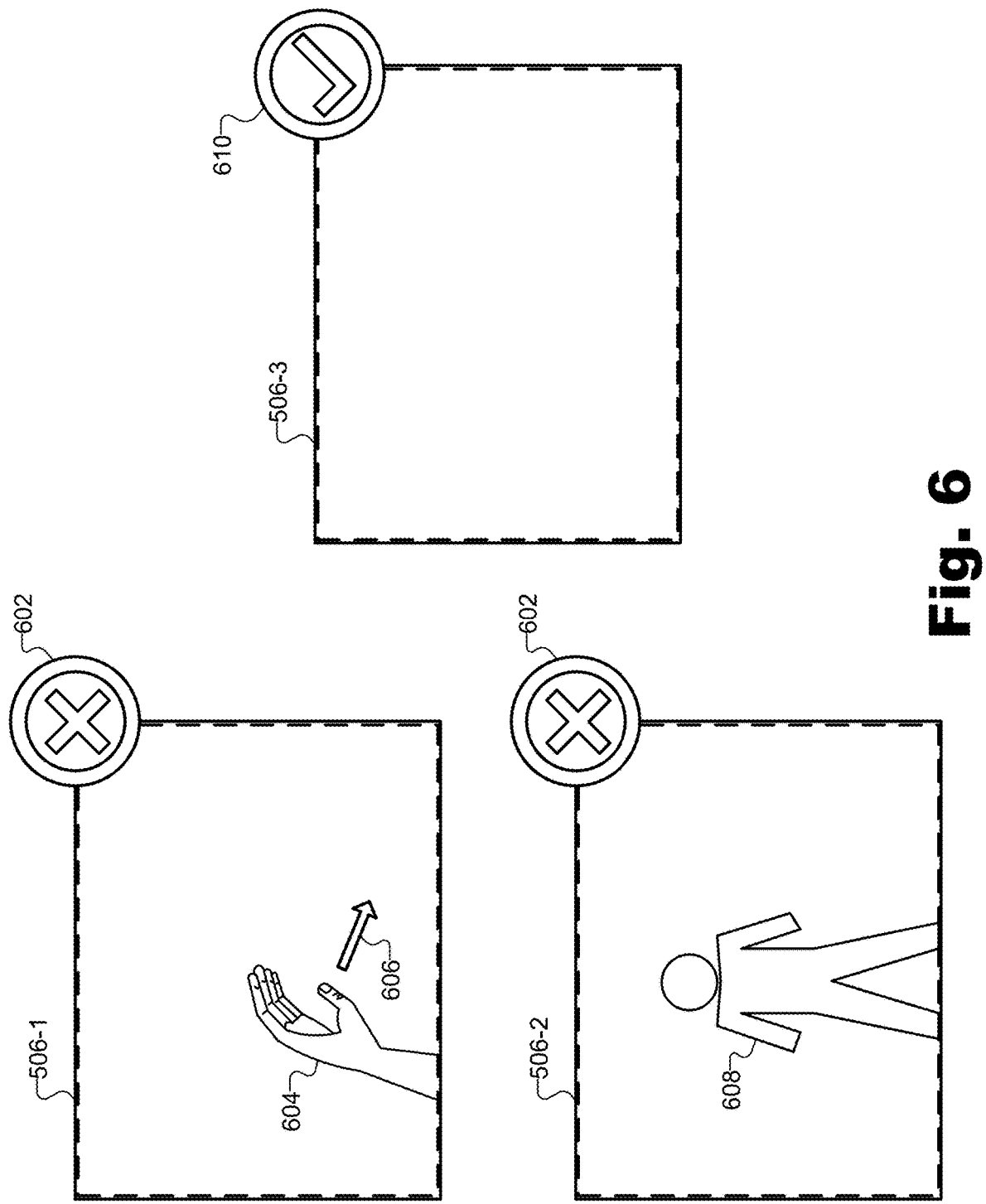
FIG. 6 illustrates several exemplary aligned images that each undergo a respective occlusion check to ensure that no occluding object is interfering with the image according to principles described herein.

To illustrate, FIG. 6 illustrates several exemplary aligned images 506 (i.e., aligned images labeled 506-1 through 506-3) that each undergo a respective occlusion check to ensure that no occluding object is interfering with the image. As with the aligned image 506 illustrated in FIG. 5, it will be understood that the relevant portion of these images is illustrated as a box with a dashed border line, and that, if no occluding object is present, the box is shown to be blank.

As shown, aligned images 506-1 and 506-2 each include a failed occlusion check indicator 602 to indicate that respective occluding objects have been detected to be in these images, and that the images may thus need to be discarded or the occluding object may otherwise need to be accounted for (e.g., cropped out if possible, etc.). Specifically, as shown, aligned image 506-1 depicts a hand occluding object 604 that happens to be moving (from frame to frame) across the captured image, as indicated by arrow 606. For example, hand occluding object 604 may be the hand of a worker that has placed a manufactured product within the field of view of the image capture device for product compliance purposes and is now moving his or her hand out of the way so that the product compliance verification may be performed. Similarly, aligned image 506-2 depicts a person 608 that happens to be standing in the middle of the frame. For example, person 608 may be a shopper who is standing in the field of view of the image capture device because the person is temporarily browsing or selecting products on a product display depicted by aligned image 506-2.

As further shown in FIG. 6, aligned image 506-3 includes a passed occlusion check indicator 610 to indicate that no occluding object is detected to be present in aligned image 506-3. Accordingly, aligned image 506-3 may now be understood to be fully preprocessed and prepared for comparison against a reference image of a predefined product standard.

System 100 may perform an occlusion check in any suitable manner as may serve a particular implementation. For instance, in a situation such as depicted in aligned image 506-1, system 100 may perform the occlusion check by accessing a prior image captured by the image capture device before aligned image 506-1 was captured, and determining that a mean-squared-error between pixel values of aligned image 506-1 and pixel values of the prior image satisfies a predetermined threshold. For example, the prior image may be an aligned image similar to aligned image 506 but captured slightly before aligned image 506 when hand occluding object 604 was at a different position and the predetermined threshold may be defined such that, when the predetermined threshold is satisfied, no occluding object is likely to be present in either the image or the prior image.

If aligned image 506-1 and the prior image represent consecutive or near consecutive frames captured by the image capture device, a mean-squared error between the respective pixels in the two images may indicate roughly how many pixels are changing in a short period of time, thereby indicating whether something is moving in the image. For example, if hand occluding object 604 is moving across the field of view from image to image (as indicated by arrow 606), the mean-squared error may be expected to be relatively high (e.g., higher than a predetermined threshold) and the image may be determined to fail the occlusion check, as indicated by failed occlusion check indicator 602. As another example, even if no hand or other occluding object is depicted in the images, if the product is still moving between frames (e.g., progressing along the manufacturing line to a point where product compliance is to be verified), the mean-squared error between consecutive images may similarly be expected to be relatively high (e.g., higher than the predetermined threshold) such that the image may similarly fail the occlusion check. In contrast, if the mean-squared error is relatively low between consecutive images, system 100 may interpret this as an indication that the product is still and that no occluding objects (at least no moving occluding objects) are interfering with the view of the product, which may weigh in favor of passing the occlusion check.

As another example, aligned image 506-2 illustrates a situation in which system 100 may perform the occlusion check by accessing sensor data indicating that no occluding object is present in the space between the image capture device and the product to interfere with the depiction of the product condition in the region of the image. For example, system 100 may access the sensor data from a proximity sensor (not shown in FIG. 6) that is configured to detect a presence of an occluding object in a space between the image capture device and the product. For example, the proximity sensor may be disposed in the retail store next to the image capture device or in another suitable location and may determine when shoppers such as person 608 may happen to be standing in front of a product display in such a way that images of the product display may be occluded. If the sensor data indicates that something (e.g., person 608, a shopping cart, etc.) is present in the space between the image capture device and the product (i.e., the product display in this example), the image may fail the occlusion check, as indicated by failed occlusion check indicator 602 on aligned image 506-2. In contrast, if the sensor data indicates that the area is clear between the image capture device and the product, this may weigh in favor of passing the occlusion check.

In other examples, system 100 may perform occlusion checks and/or otherwise determine if images are analyzable in other ways as may serve a particular implementation. For example, system 100 may use object recognition technology to scan an image for an expected occluding object (e.g., a hand, a shopper, etc.). As another example, system 100 may attempt to identify what is depicted in an image if what is depicted is not as expected. For instance, if an expected product is not determined to be present in a particular shelf space, system 100 may confirm that an empty shelf (rather than an unrecognized occluding object) is detected before indicating that a product compliance issue has been found. If no empty shelf is detected in the image in this example, system 100 may determine that an image has merely failed an occlusion check, rather than that a product compliance verification issue has been identified.

Figure 7:
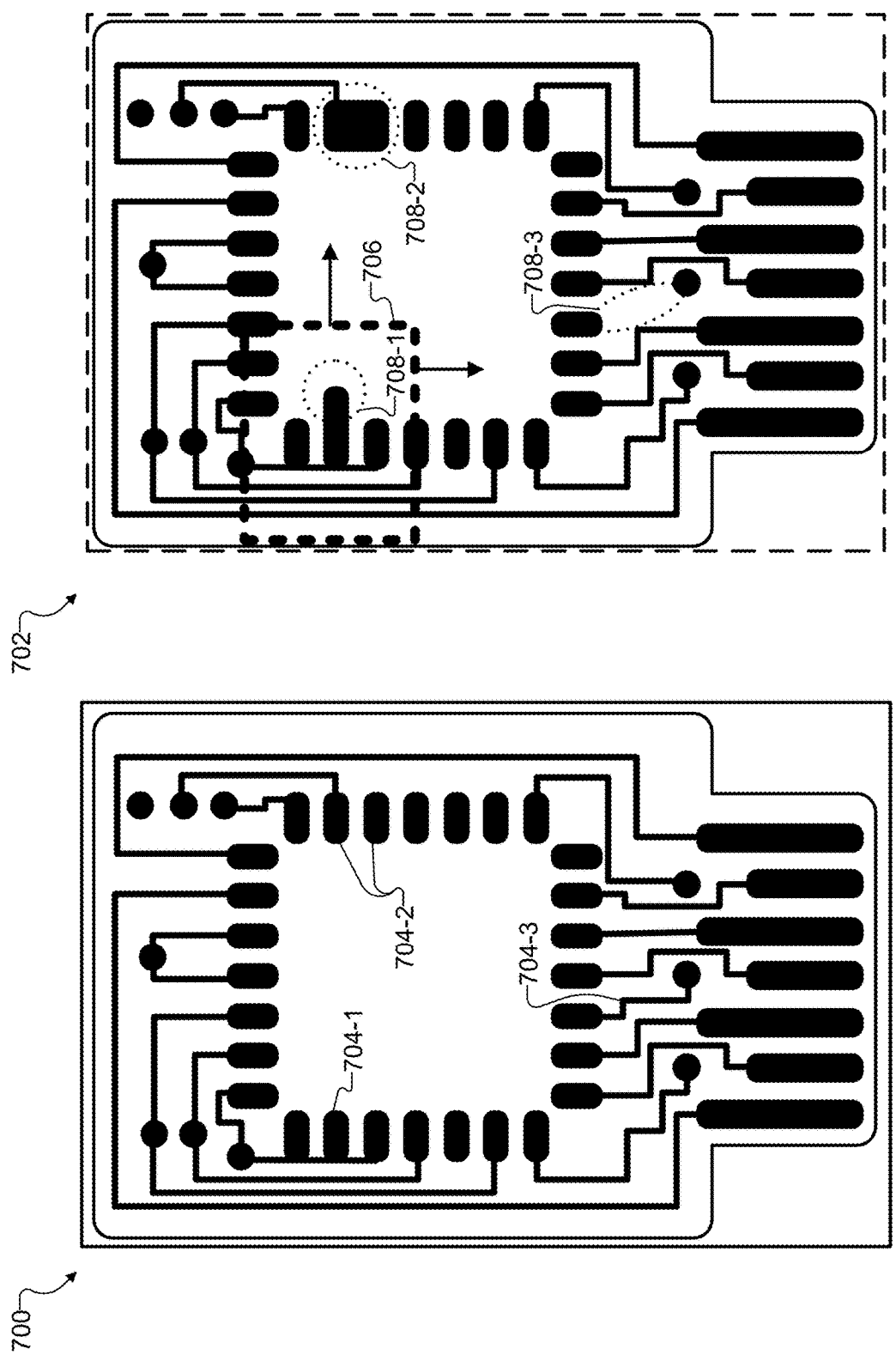
FIG. 7 illustrates an exemplary reference image of a product manufacturing standard and an exemplary image depicting a product that is to comply with the product manufacturing standard according to principles described herein.
Figure 8:
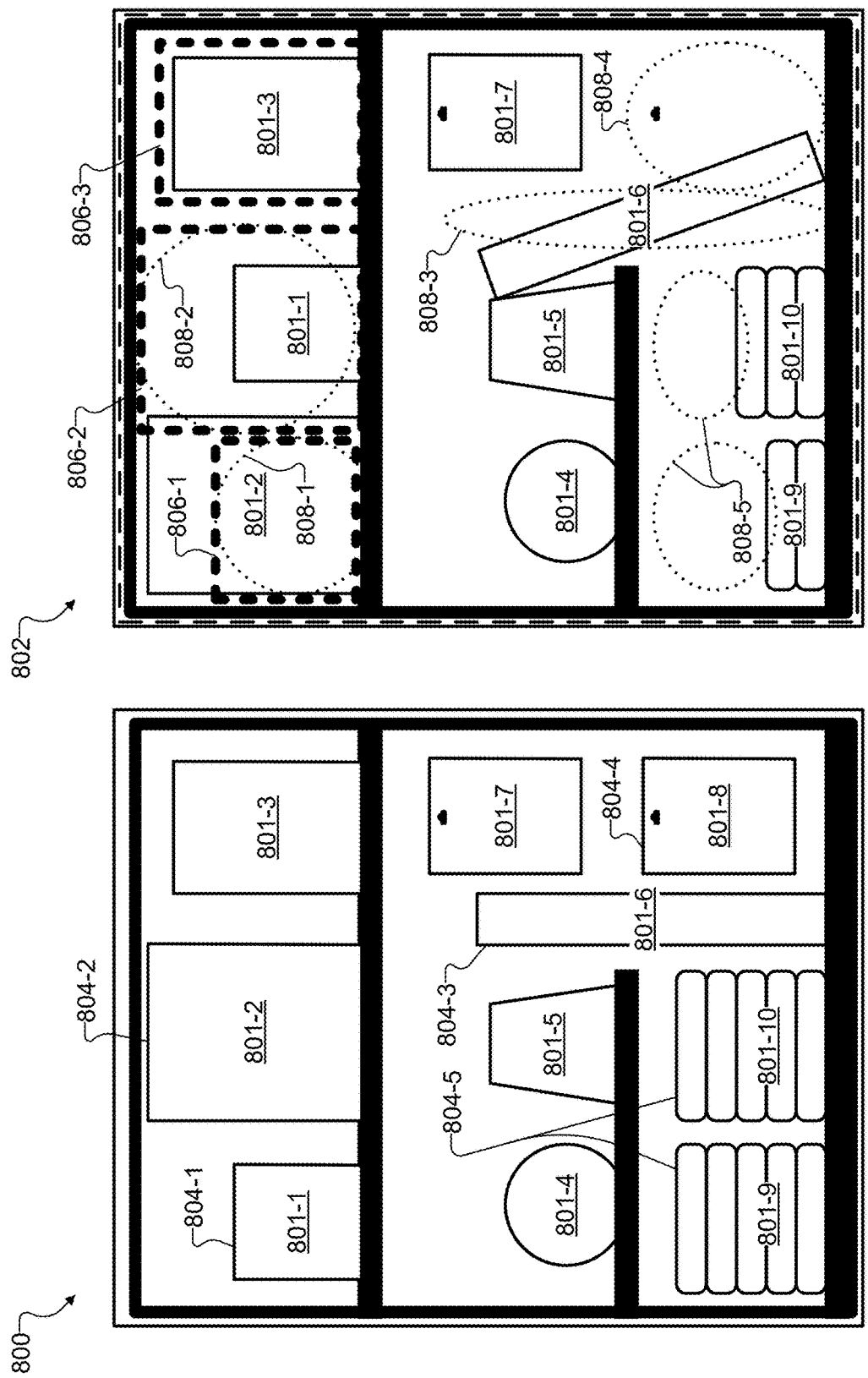
FIG. 8 illustrates an exemplary reference image of a planogram and an exemplary image depicting products that are to comply with the planogram according to principles described herein.

Once an image captured by an image capture device 206 has been preprocessed to be properly aligned and has passed an occlusion check as described above, system 100 may identify criteria associated with the predefined product standard and may identify regions of the image that are associated with product conditions that are to be verified for compliance with the respective criteria. System 100 may then determine whether the product conditions comply with the identified criteria for each identified region in the image. FIGS. 7 and 8 illustrate these operations for a manufacturing example involving a manufacturing standard, and a retail product display example involving a planogram, respectively. More specifically, FIG. 7 illustrates an exemplary reference image 700 of a product manufacturing standard alongside an exemplary image 702 depicting a product that is to comply with the product manufacturing standard. Similarly, FIG. 8 illustrates an exemplary reference image 800 of a planogram alongside an exemplary image 802 depicting products that are to comply with the planogram.

Referring to FIG. 7, an example will now be described in which the image capture device captures an image of a product when the product is being manufactured in accordance with a predefined product standard that includes a plurality of manufacturing parameters (e.g., a manufacturing standard). More particularly, the product being manufactured in this example is a printed circuit board ("PCB") that includes various traces, pads, vias, and so forth, as shown. The manufacturing standard predefined for the PCB of the example of FIG. 7 may define various different types of criteria. For example, certain criteria of the manufacturing standard may indicate where various elements (e.g., traces, pads, vias, planes, etc.) are to be placed on the PCB, tolerances for each of these elements (e.g., a range of acceptable lengths and/or widths of each trace and pad, a range of acceptable diameters for each via, etc.), and so forth. A reference image such as reference image 700 may be provided as part of the manufacturing standard for image 702 to be compared against during a compliance verification check. As such it will be understood that all of the elements depicted in reference image 700 are as the designer intended and are what each PCB manufactured is to comply with (within a predetermined margin of error).

As shown, a few criteria 704 (e.g., criterion 704-1 through criterion 704-3) of the manufacturing standard are called out in reference image 700 of FIG. 7. As will be described in more detail below, these specific criteria are the criteria that product conditions of the PCB depicted in image 702 will be determined not to comply with. However, it will be understood that many other criteria not explicitly called out in reference image 700 (e.g., the location, size, and orientation of each element of the PCB, etc.) may further be defined within the manufacturing standard, and that image 702 may be determined to comply with each of these criteria in a satisfactory way.

As shown, image 702 has been preprocessed (as described above) to align with reference image 700, thereby allowing for a straight, region-to-region comparison between image 702 and reference image 700 as part of a product compliance verification procedure. Accordingly, system 100 may identify a region 706 that is associated with one or more product conditions that are to be verified for compliance with one or more identified criteria (e.g., criteria 704 or various other criteria as described above). Region 706 may depict a portion of the product that has undergone a manufacturing operation configured to implement, with respect to the depicted portion of the product, the product condition to be verified. For instance, various pads and traces may have been deposited onto a substrate during the manufacturing process of the PCB and region 706 may depict the state or condition of some of these pads and traces included on a particular part of the PCB. The identified criteria may each be different manufacturing parameters, from the plurality of manufacturing parameters of the manufacturing standard, that define acceptable implementations of the product condition such that the depicted portion of the product is deemed to be free of manufacturing defects arising from the manufacturing operation when the determining indicates that the product condition complies with the identified criteria. For example, the identified criteria may indicate dimensions and locations for each PCB element such that, if the condition of each manufactured element in region 706 complies with these dimensions and locations, these elements within region 706 may be deemed to be free of manufacturing errors.

The location of region 706 within image 702 may be identified in any suitable way. For example, as indicated by the arrows attached to region 706 in FIG. 7, region 706 may be implemented as a sliding window of a preset size that moves across the entirety of image 702 (e.g., from left to right and from top to bottom as one might read a page of text, or in any other suitable way). In this example, region 706 may be identified by traversing the window from a previous region to a subsequent region (e.g., to the right, down to a new horizontal line, etc.) in an orderly sequence of regions covering the entirety of image 702. It will be understood that the preset size of the window may be any size as may serve a particular implementation. For example, the window size of a given implementation may be selected to balance the more granular feature checking provided by a smaller window size with the greater tendency to avoid false negatives provided by a larger window.

For a given region 706, system 100 may perform at least two major operations to determine whether any product defects are present (i.e., to determine whether product conditions comply with identified criteria within the region).

First, system 100 may photometrically normalize the corresponding regions of reference image 700 and image 702 (e.g., accounting for illumination variations or otherwise matching the image brightness between the images). In certain implementations, the entire image 702 may be photometrically normalized to be photometrically aligned with reference image 700 as a preprocessing step (e.g., together with other preprocessing steps described above). However, in other implementations, this preprocessing step may be eliminated, and the photometric normalization may be made more granular and accurate by system 100 being configured to perform photometric normalization independently, region-by-region as the image analysis is ongoing. In some examples, reference image 700 may be a grayscale image and system 100 may convert region 706 of image 702 to grayscale as a first step in the photometric normalization process. Thereafter, system 100 may photometrically normalize the depiction of the portion of the product in region 706 to photometrically align with an expected portion corresponding to the portion of the product (i.e., with a corresponding region of reference image 700) by brightening or darkening each of the pixel values to at least approximately match the illumination of the reference image pixel values.

Second, system 100 may determine whether the photometrically normalized regions of the images match to an acceptable degree. This determination may be made in any suitable manner. For instance, system 100 may determine whether a mean-squared-error between pixel values of the portion of the product in region 706 and pixel values of the expected portion corresponding to the portion of the product (i.e., the corresponding portion of the ideal product depicted in the corresponding region of reference image 700) satisfies a predetermined threshold. The predetermined threshold may be defined such that, when the predetermined threshold is satisfied (e.g., when the mean-squared-error is at or below the threshold level in this example), the product condition is deemed to comply with the identified criterion (i.e., the regions are determined to match). In contrast, when the predetermined threshold is not satisfied (e.g., when the mean-squared error is greater than the threshold level to thereby indicate significant differences between the regions), the product condition being tested is deemed to not comply with the identified criterion and a product compliance verification issue is determined to exist.

As used herein, product conditions may refer to any product characteristics or aspects of product placement, position, state, or the like that may be addressed by a criterion of a predefined product standard. For instance, in this example, product conditions verified within region 706 may include the position and relative size of the pads and traces shown. In other manufacturing examples besides the present PCB manufacturing example, product conditions may relate to other aspects of other types of products. For instance, for a textile product, a product condition may be a smooth and defectless nature of the product; for a label manufacturing product, a product condition may be the text printed on the label, and so forth. Accordingly, criteria of a manufacturing standard that the product conditions are being verified to comply with may refer to element size and location for the PCB example, texture smoothness or color homogeneity for the textile example, proper predefined text for the label example, and the like.

As shown in FIG. 7, certain product conditions may be determined to be non-compliant with certain criteria 704 as region 706 traverses image 702 during the product compliance verification process. Specifically, as shown, a compliance issue 708-1 is detected at the current region 706 illustrated in FIG. 7 because one of the pads is significantly longer than the reference pad defined by criterion 704-1. Another compliance issue 708-2 may be detected when the sliding window moves to another region of the PCB because two separate pads identified by criterion 704-2 have been manufactured as one large pad. Yet another exemplary compliance issue 708-3 is shown toward the bottom of the PCB because a trace defined by criterion 704-3 is shown to be missing on the manufactured PCB depicted in image 702. Each of these compliance issues may be detected due to a mean-squared error being greater than a threshold value (i.e., failing to satisfy a predetermined threshold) and thereby indicating the deviation from the manufacturing standard. As described above, compliance verification data representative of these compliance issues 708 (i.e., compliance issues 708-1 through 708-3) may be generated and provided to a monitoring system so that proper action may be taken to fix or discard the defective PCB.

Referring now to FIG. 8, an example will be described in which the image capture device captures an image of a product when the product is presented in a product display in accordance with a predefined product standard that includes a planogram defining a particular location for the product to be presented with respect to the product display and a particular manner in which the product is to be presented. More particularly, the product in this example may refer to any of several products 801 (e.g., products 801-1 through 801-10) that will be understood to represent retail items such as food items, housewares, electronics, or the like. The example of FIG. 8 relates to a retail product display including various shelves upon which various products of different shapes and sizes are presented in accordance with a planogram standard, as shown. The planogram predefined for the product display of the example of FIG. 8 may define various different types of criteria. For example, certain criteria of the planogram may indicate where products are to be placed, how products are to be arranged and oriented (e.g., which direction the products should face, how many products are to be stacked on top of each other, etc.), tolerances for each of these product placements (e.g., an acceptable distance from an ideal location on the shelf for each product, a minimum acceptable quantity of units of each product type that should be stocked, etc.), and so forth. A reference image such as reference image 800 may be provided as part of the planogram standard for image 802 to be compared against during a compliance verification check. As such, it will be understood that all of products 801 depicted in reference image 800 are arranged, placed, and stocked as a designer of the planogram intended and represent what the product display is to comply with (within a predetermined margin of error).

As shown, a few criteria 804 (e.g., criterion 804-1 through criterion 804-5) of the planogram are called out in reference image 800 of FIG. 8. As will be described in more detail below, these specific criteria are the criteria that product conditions of the products depicted in the product display in image 802 will be determined not to comply with. However, it will be understood that many other criteria not explicitly called out in reference image 800 (e.g., the placement, orientation, ideal quantity, and so forth for each product 801) may further be defined within the planogram and may be determined to be complied with in a satisfactory way.

As shown, image 802 has been preprocessed to align with reference image 800, thereby allowing for a straight, region-to-region comparison between image 802 and reference image 800 as part of a product compliance verification procedure. Accordingly, system 100 may identify a region 806 (e.g., any of regions 806-1 through 806-3 shown in FIG. 8 or any of various other product regions not explicitly called out in FIG. 8) that is associated with one or more product conditions that are to be verified for compliance with one or more identified criteria (e.g., criteria 804 or various other criteria as described above). Regions 806 may each depict a particular location of the product display defined by the planogram for a particular product to be presented in a particular manner defined by the planogram. For instance, each product 801 may have a designated place at a particular location on a particular shelf in the product display and each region 806 may depict the condition (e.g., location, orientation, etc.) of actual products that may or may not be presented appropriately at one of these locations. The identified criteria may each be that a particular product 801 is presented at a particular location and in a particular manner defined by the planogram such that the particular location of the product display is deemed to be free of placement issues when the determining indicates that the product condition complies with the identified criterion.

The location of regions 806 within image 802 may be identified in any suitable way. For example, as described above, a sliding window similar to the window described above in relation to the manufacturing example may be used in certain implementations. However, for various reasons including that retail items may not reasonably be placed on product display shelves with the same precision as elements are deposited on a precisely-manufactured product like a PCB, it may be desirable in other implementations to identify regions 806 in other ways. For example, regions 806 may be predetermined and pre-calibrated based on where an image capture device is positioned (e.g., mounted on the ceiling, etc.) with respect to a particular product display. Specifically, regions of interest may be predefined as certain shelf positions or other product display positions within the product display. As another example, a region of interest may be defined where a particular product is identified or recognized. For instance, system 100 may search for a particular product 801 within image 802 (e.g., based on known features of the object, etc.) and one or more regions 806 may be defined based on where the product 801 is found to be located.

For a given region 806, system 100 may determine whether any product is misplaced, or another violation of the planogram exists (i.e., may determine whether product conditions comply with identified criteria within the region). To accomplish this, system 100 may first determine which product is expected to be in a particular region and then determine if the expected product is indeed present and presented in the proper manner (e.g., fully stocked with an appropriate quantity, oriented properly, etc.). System 100 may determine which products are expected in different regions based on a preliminary process (e.g., a one-time process) in which system 100 scans products that are known to be properly placed (e.g., by being checked by an authorized person such as a store manager) for identifiable features such as key points acting as unique pixels in the scan that help identify characteristics of the image, descriptors providing parameters that define the key points and their relation with neighboring pixels, and so forth. For example, scale-invariant feature transform ("SIFT") features and descriptors that favor corner identification may be used for this purpose in some examples, or other types of features (e.g., SURF features, ORB features, BRISK features, etc.) may be employed in other examples as may serve a particular implementation.

When the preliminary process is complete (before product compliance verification is to be performed), system 100 may have access to data representative of expected locations for each product 801 (e.g., x-y coordinates of where the product is to be located) as well as other placement details (e.g., orientation details, etc.) and margins of error for each product 801. System 100 may also have access to information representative of a reference image for each product 801 such that system 100 may detect or identify each product 801 based on features of the product. Accordingly, system 100 may perform an initial matching process with respect to a first image frame in order to match key points and descriptors between each reference image for each product and corresponding regions 806 where the products are found in the initial image frame. Thereafter, processing any image captured by the image capture device (e.g., such as image 802) may involve ensuring that the proper products are still detected to be located at the proper regions in the same way and flagging any discrepancies that may be detected (e.g., when a product is moved, when an improper product is placed in a certain location, etc.).

More specifically, if a particular product is depicted in a particular region 806 of image 802 and a particular criterion of the planogram includes data representative of a predetermined set of features (e.g., key points and descriptors) associated with an expected product that is to be depicted in the particular region 806, system 100 may determine whether the product condition complies with the identified criterion by comparing the predetermined set of features associated with the expected product to a corresponding set of features detected in the depiction of the particular product in the particular region 806. In this way, system 100 may detect whether the particular product located at the particular region 806 is the expected product.

To illustrate, FIG. 8 illustrates certain product conditions that may be determined, in the manner that has been described, to be non-compliant with certain criteria 804 for various different regions 806. Specifically, FIG. 8 shows various compliance issues 808 (e.g., compliance issues 808-1 through 808-5) that system 100 may detect in the product display depicted in image 802.

For example, system 100 may detect a compliance issue 808-1 in region 806-1 when the expected product 801-1 is not found but, instead, a portion of product 801-2 is shown in that region. Similarly, because products 801-1 and 801-2 have apparently been switched on the shelf, a second compliance issue 808-2 may be detected when system 100 analyzes region 806-2 to determine that product 801-1 is presented rather than the expected product 801-2. Compliance issue 808-3 may be identified due to a non-compliant orientation or presentation of product 801-6, despite the fact that product 801-6 is present and is in approximately the right location. Specifically, in this case, product 801-6 has tipped over and is thus not properly oriented and presented (e.g., in the upright pose shown in reference image 800).

As another example, system 100 may detect compliance issue 808-4 due to the fact that expected product 801-8 is out of stock and is thus not present in image 802 as expected. Similarly, system 100 may detect compliance issues 808-5 for the stacks of products 801-9 and 801-10, which may be lower than a required quantity defined by the planogram. For example, the planogram may require that a quantity of four to six items of each product type are to be in stock for full compliance, thus causing the stack of two items of product 801-9 and three items of product 801-10 to each be determined to be non-compliant. As described above, compliance verification data representative of these compliance issues 808 may be generated and provided to a monitoring system so that proper action may be taken to fix the detected defects in the retail display.

While the examples described in detail herein have related to product compliance verification of either a manufacturing defect detection variety or a planogram compliance monitoring variety, it will be understood that similar principles may be applied to various other types of product compliance verification. Moreover, it will be understood that, in certain implementations, system 100 may be configured to perform multiple types of computer-vision-based product compliance verification at once. For instance, in certain implementations, system 100 may be configured to monitor products for compliance with a planogram and also to detect if any products being presented on a particular product display appear to have manufacturing or other defects. For example, along with ensuring that cereal boxes are in the right places on a shelf of different types of cereal boxes, system 100 may further be configured to detect if one of the cereal boxes has been opened or has a tear down the side. As another example, along with ensuring the clothing in a display rack is hung in the right places, system 100 may further be determined to detect if the clothing has stains, rips, etc., that would make it undesirable for shoppers to purchase.

Figure 9:
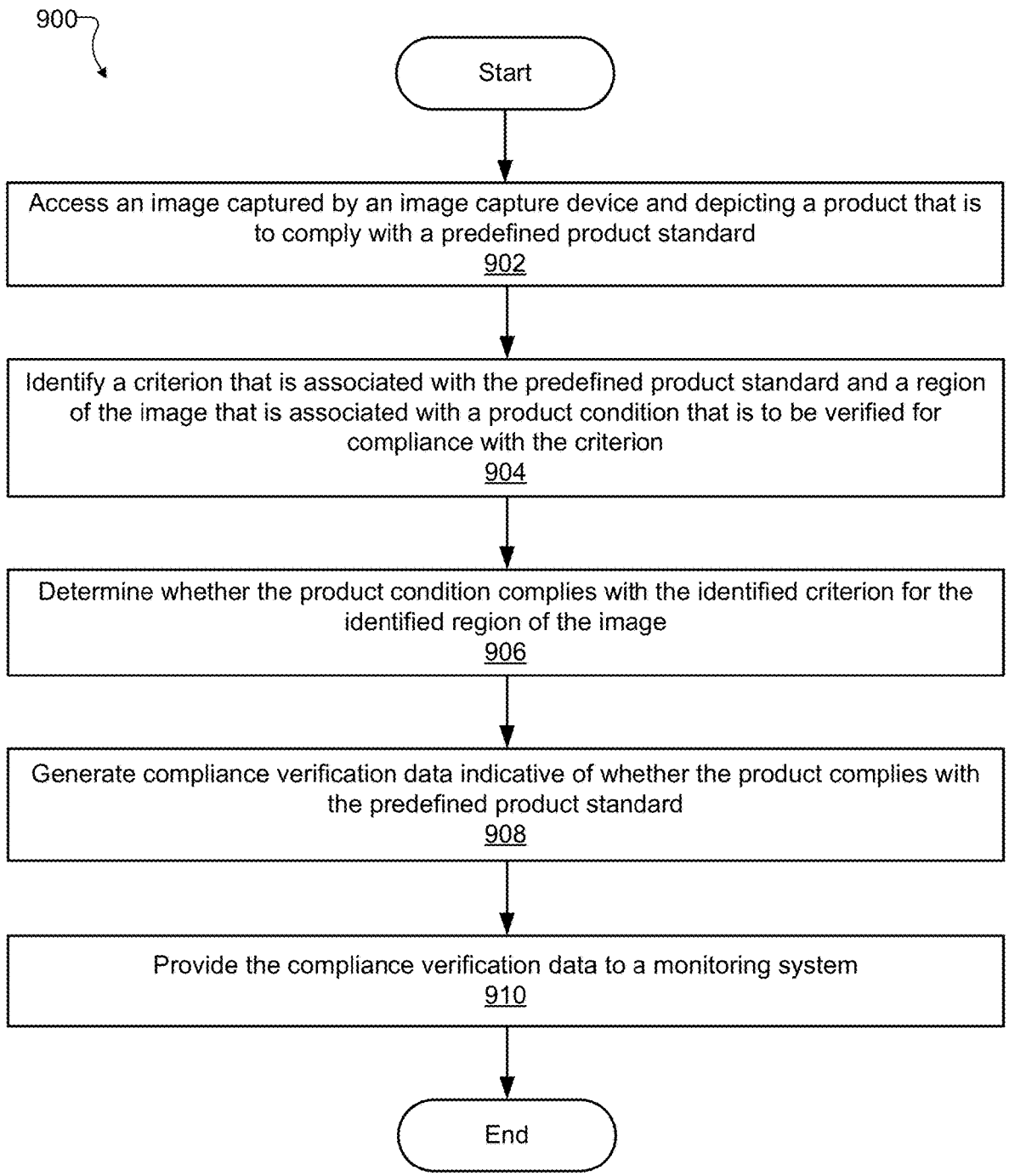
FIG. 9 illustrates an exemplary method for computer-vision-based product compliance verification according to principles described herein.

FIG. 9 illustrates an exemplary method 900 for computer-vision-based product compliance verification. While FIG. 9 illustrates exemplary operations according to one embodiment, other embodiments may omit, add to, reorder, and/or modify any of the operations shown in FIG. 9. One or more of the operations shown in FIG. 9 may be performed by system 100, any components included therein, and/or any implementation thereof.

In operation 902, a computer vision system implemented by a MEC server may access an image captured by an image capture device communicatively coupled with the MEC server. In some examples, the image may depict a product that is to comply with a predefined product standard. Operation 902 may be performed in any of the ways described herein.

In operation 904, the computer vision system may identify a criterion that is associated with the predefined product standard. In operation 904, the computer vision system may also identify a region of the image that is associated with a product condition that is to be verified for compliance with this identified criterion. Operation 904 may be performed in any of the ways described herein.

In operation 906, the computer vision system may determine, for the identified region of the image, whether the product condition complies with the identified criterion. Operation 906 may be performed in any of the ways described herein.

In operation 908, the computer vision system may generate compliance verification data indicative of whether the product complies with the predefined product standard. For example, the computer vision system may generate the compliance verification data based on the determining in operation 906 of whether the product condition complies with the identified criterion. Operation 908 may be performed in any of the ways described herein.

In operation 910, the computer vision system may provide the compliance verification data generated in operation 908 to a monitoring system. In some examples, the monitoring system may be separate from and communicatively coupled to the MEC server implementing the computer vision system. Operation 910 may be performed in any of the ways described herein.

In certain embodiments, one or more of the systems, components, and/or processes described herein may be implemented and/or performed by one or more appropriately configured computing devices. To this end, one or more of the systems and/or components described above may include or be implemented by any computer hardware and/or computer-implemented instructions (e.g., software) embodied on at least one non-transitory computer-readable medium configured to perform one or more of the processes described herein. In particular, system components may be implemented on one physical computing device or may be implemented on more than one physical computing device. Accordingly, system components may include any number of computing devices, and may employ any of a number of computer operating systems.

In certain embodiments, one or more of the processes described herein may be implemented at least in part as instructions embodied in a non-transitory computer-readable medium and executable by one or more computing devices. In general, a processor (e.g., a microprocessor) receives instructions, from a non-transitory computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media, and/or volatile media. Non-volatile media may include, for example, optical or magnetic disks and other persistent memory. Volatile media may include, for example, dynamic random access memory ("DRAM"), which typically constitutes a main memory. Common forms of computer-readable media include, for example, a disk, hard disk, magnetic tape, any other magnetic medium, a compact disc read-only memory ("CD-ROM"), a digital video disc ("DVD"), any other optical medium, random access memory ("RAM"), programmable read-only memory ("PROM"), electrically erasable programmable read-only memory ("EPROM"), FLASH-EEPROM, any other memory chip or cartridge, or any other tangible medium from which a computer can read.

Figure 10:
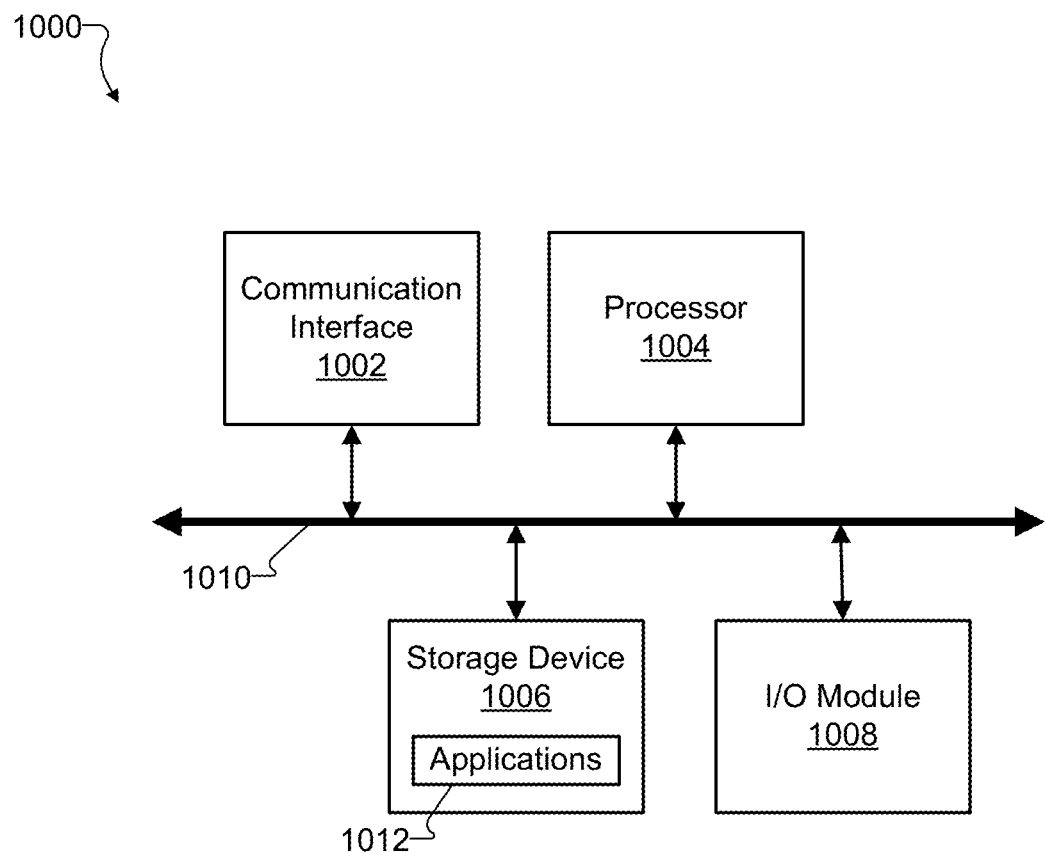
FIG. 10 illustrates an exemplary computing device according to principles described herein.

FIG. 10 illustrates an exemplary computing device 1000 that may be specifically configured to perform one or more of the processes described herein. As shown in FIG. 10, computing device 1000 may include a communication interface 1002, a processor 1004, a storage device 1006, and an input/output ("I/O") module 1008 communicatively connected via a communication infrastructure 1010. While an exemplary computing device 1000 is shown in FIG. 10, the components illustrated in FIG. 10 are not intended to be limiting. Additional or alternative components may be used in other embodiments. Components of computing device 1000 shown in FIG. 10 will now be described in additional detail.

Communication interface 1002 may be configured to communicate with one or more computing devices. Examples of communication interface 1002 include, without limitation, a wired network interface (such as a network interface card), a wireless network interface (such as a wireless network interface card), a modem, an audio/video connection, and any other suitable interface.

Processor 1004 generally represents any type or form of processing unit capable of processing data or interpreting, executing, and/or directing execution of one or more of the instructions, processes, and/or operations described herein. Processor 1004 may direct execution of operations in accordance with one or more applications 1012 or other computer-executable instructions such as may be stored in storage device 1006 or another computer-readable medium.

Storage device 1006 may include one or more data storage media, devices, or configurations and may employ any type, form, and combination of data storage media and/or device. For example, storage device 1006 may include, but is not limited to, a hard drive, network drive, flash drive, magnetic disc, optical disc, RAM, dynamic RAM, other non-volatile and/or volatile data storage units, or a combination or sub-combination thereof. Electronic data, including data described herein, may be temporarily and/or permanently stored in storage device 1006. For example, data representative of one or more executable applications 1012 configured to direct processor 1004 to perform any of the operations described herein may be stored within storage device 1006. In some examples, data may be arranged in one or more databases residing within storage device 1006.

I/O module 1008 may include one or more I/O modules configured to receive user input and provide user output. One or more I/O modules may be used to receive input for a single virtual experience. I/O module 1008 may include any hardware, firmware, software, or combination thereof supportive of input and output capabilities. For example, I/O module 1008 may include hardware and/or software for capturing user input, including, but not limited to, a keyboard or keypad, a touchscreen component (e.g., touchscreen display), a receiver (e.g., an RF or infrared receiver), motion sensors, and/or one or more input buttons.

I/O module 1008 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 1008 is configured to provide graphical data to a display for presentation to a user. The graphical data may be representative of one or more graphical user interfaces and/or any other graphical content as may serve a particular implementation.

In some examples, any of the facilities described herein may be implemented by or within one or more components of computing device 1000. For example, one or more applications 1012 residing within storage device 1006 may be configured to direct processor 1004 to perform one or more processes or functions associated with processing facility 104 of system 100. Likewise, storage facility 102 of system 100 may be implemented by or within storage device 1006.

To the extent the aforementioned embodiments collect, store, and/or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:
    accessing, by a computer vision system implemented by a multi-access edge computing ("MEC") server integrated within a provider network, an image captured by an image capture device communicatively coupled with the MEC server by way of the provider network, the image depicting a product that is to comply with a predefined product standard;
    performing, by the computer vision system and based on the predefined product standard, a preprocessing operation on the image to prepare the image to be analyzed with respect to the predefined product standard;
    identifying, by the computer vision system, a criterion that is associated with the predefined product standard, and a region of the image that is associated with a product condition that is to be verified for compliance with the criterion;
    determining, by the computer vision system for the identified region of the image and based on the performing of the preprocessing operation, whether the product condition complies with the identified criterion;
    generating, by the computer vision system based on the determining of whether the product condition complies with the identified criterion, compliance verification data indicative of whether the product complies with the predefined product standard; and
    providing, by the computer vision system, the compliance verification data to a monitoring system separate from and communicatively coupled to the MEC server by way of the provider network.

2. The method of claim 1, wherein:
    the image capture device captures the image when the product is being manufactured;
    the identified region of the image depicts a portion of the product that has undergone a manufacturing operation configured to implement, with respect to the depicted portion of the product, the product condition to be verified; and
    the identified criterion is a manufacturing parameter, from a plurality of manufacturing parameters, that defines an acceptable implementation of the product condition such that the depicted portion of the product is deemed to be free of manufacturing defects arising from the manufacturing operation when the determining indicates that the product condition complies with the identified criterion.

3. The method of claim 1, wherein:
    the image capture device captures the image when the product is presented in a product display in accordance with a planogram defining a particular location for the product to be presented with respect to the product display and a particular manner in which the product is to be presented;
    the identified region of the image depicts the particular location of the product display defined by the planogram for the product to be presented in the particular manner defined by the planogram; and
    the identified criterion is that the product is presented at the particular location and in the particular manner defined by the planogram such that the particular location of the product display is deemed to be free of placement issues when the determining indicates that the product condition complies with the identified criterion.

4. The method of claim 1, further comprising performing, by the computer vision system prior to the determining of whether the product condition complies with the identified criterion, an occlusion check with respect to the image, the occlusion check configured to ensure that no occluding object is interfering with a depiction of the product condition in the region of the image.

5. The method of claim 4, wherein the performing of the occlusion check comprises accessing, from a proximity sensor configured to detect a presence of an occluding object in a space between the image capture device and the product, sensor data indicating that no occluding object is present in the space between the image capture device and the product to interfere with the depiction of the product condition in the region of the image.

6. The method of claim 4, wherein the performing of the occlusion check comprises:
accessing a prior image captured by the image capture device before the image was captured; and
determining that a mean-squared-error between pixel values of the image and pixel values of the prior image satisfies a predetermined threshold defined such that, when the predetermined threshold is satisfied, no occluding object is likely to be present in either the image or the prior image.

7. The method of claim 1, wherein:
the product is depicted in the identified region of the image;
the identified criterion includes data representative of a predetermined set of features associated with an expected product that is to be depicted in the identified region of the image; and
the determining of whether the product condition complies with the identified criterion is performed by comparing the predetermined set of features associated with the expected product to a corresponding set of features detected in the depiction of the product in the identified region of the image in order to detect whether the product located at the identified region is the expected product.

8. The method of claim 1, wherein:
a portion of the product is depicted in the identified region of the image;
the identified criterion includes data representative of an expected portion corresponding to the portion of the product;
the preprocessing operation includes photometrically normalizing the depiction of the portion of the product to photometrically align with the expected portion corresponding to the portion of the product; and
the determining of whether the product condition complies with the identified criterion includes determining whether a mean-squared-error between pixel values of the portion of the product and pixel values of the expected portion corresponding to the portion of the product satisfies a predetermined threshold defined such that, when the predetermined threshold is satisfied, the product condition is deemed to comply with the identified criterion.

9. The method of claim 1, wherein:
the preprocessing operation includes an image alignment operation with respect to the image, the image alignment operation configured to align the image for an application of the identified criterion associated with the predefined product standard; and
the image alignment operation includes at least one of a lateral translation alignment operation, a zoom translation alignment operation, a rotational translation alignment operation, and a geometric transformation alignment operation.

10. The method of claim 1, embodied as computer-executable instructions on at least one non-transitory computer-readable medium.

11. A system comprising:
a memory storing instructions; and
a processor of a multi-access edge computing ("MEC") server integrated within a provider network, the processor communicatively coupled with the memory and configured to execute the instructions to:
access an image captured by an image capture device communicatively coupled with the MEC server by way of the provider network, the image depicting a product that is to comply with a predefined product standard;
perform, based on the predefined product standard, a preprocessing operation on the image to prepare the image to be analyzed with respect to the predefined product standard;
identify a criterion that is associated with the predefined product standard, and a region of the image that is associated with a particular product condition that is to be verified for compliance with the criterion;
determine, for the identified region of the image and based on the performing of the preprocessing operation, whether the product condition complies with the identified criterion;
generate, based on the determining of whether the product condition complies with the identified criterion, compliance verification data indicative of whether the product complies with the predefined product standard; and
provide the compliance verification data to a monitoring system separate from and communicatively coupled to the MEC server by way of the provider network.

12. The system of claim 11, wherein:
the image capture device captures the image when the product is being manufactured;
the identified region of the image depicts a portion of the product that has undergone a manufacturing operation configured to implement, with respect to the depicted portion of the product, the product condition to be verified; and
the identified criterion is a manufacturing parameter, from a plurality of manufacturing parameters, that defines an acceptable implementation of the product condition such that the depicted portion of the product is deemed to be free of manufacturing defects arising from the manufacturing operation when the determining indicates that the product condition complies with the identified criterion.

13. The system of claim 11, wherein:
the image capture device captures the image when the product is presented in a product display in accordance with a planogram defining a particular location for the product to be presented with respect to the product display and a particular manner in which the product is to be presented;
the identified region of the image depicts the particular location of the product display defined by the planogram for the product to be presented in the particular manner defined by the planogram; and
the identified criterion is that the product is presented at the particular location and in the particular manner defined by the planogram such that the particular location of the product display is deemed to be free of placement issues when the determining indicates that the product condition complies with the identified criterion.

14. The system of claim 11, wherein the processor is further configured to execute the instructions to perform, prior to the determining of whether the product condition complies with the identified criterion, an occlusion check with respect to the image, the occlusion check configured to ensure that no occluding object is interfering with a depiction of the product condition in the region of the image.

15. The system of claim 14, wherein the performing of the occlusion check comprises accessing, from a proximity sensor configured to detect a presence of an occluding object in a space between the image capture device and the product, sensor data indicating that no occluding object is present in the space between the image capture device and the product to interfere with the depiction of the product condition in the region of the image.

16. The system of claim 14, wherein the performing of the occlusion check comprises:
   accessing a prior image captured by the image capture device before the image was captured; and
   determining that a mean-squared-error between pixel values of the image and pixel values of the prior image satisfies a predetermined threshold defined such that, when the predetermined threshold is satisfied, no occluding object is likely to be present in either the image or the prior image.

17. The system of claim 11, wherein:
   the product is depicted in the identified region of the image;
   the identified criterion includes data representative of a predetermined set of features associated with an expected product that is to be depicted in the identified region of the image; and
   the determining of whether the product condition complies with the identified criterion is performed by comparing the predetermined set of features associated with the expected product to a corresponding set of features detected in the depiction of the product in the identified region of the image in order to detect whether the product located at the identified region is the expected product.

18. The system of claim 11, wherein:
   a portion of the product is depicted in the identified region of the image;
   the identified criterion includes data representative of an expected portion corresponding to the portion of the product;
   the preprocessing operation includes photometrically normalizing the depiction of the portion of the product to photometrically align with the expected portion corresponding to the portion of the product; and
   the determining of whether the product condition complies with the identified criterion includes determining whether a mean-squared-error between pixel values of the portion of the product and pixel values of the expected portion corresponding to the portion of the product satisfies a predetermined threshold defined such that, when the predetermined threshold is satisfied, the product condition is deemed to comply with the identified criterion.

19. The system of claim 11, wherein:
   the preprocessing operation includes an image alignment operation with respect to the image, the image alignment operation configured to align the image for an application of the identified criterion associated with the predefined product standard; and
   the image alignment operation includes at least one of a lateral translation alignment operation, a zoom translation alignment operation, a rotational translation alignment operation, and a geometric transformation alignment operation.

20. A system comprising:
   an image capture device configured to capture an image depicting a product that is to comply with a predefined product standard;
   a monitoring system; and
   a multi-access edge computing ("MEC") server integrated within a provider network, the MEC server separate from and communicatively coupled with the image capture device and the monitoring system by way of the provider network and configured to:
      access, from the image capture device, the image depicting the product that is to comply with the predefined product standard,
      perform, based on the predefined product standard, a preprocessing operation on the image to prepare the image to be analyzed with respect to the predefined product standard,
      identify a criterion that is associated with the predefined product standard, and a region of the image that is associated with a particular product condition that is to be verified for compliance with the criterion,
      determine, for the identified region of the image and based on the performing of the preprocessing operation, whether the product condition complies with the identified criterion,
      generate, based on the determining of whether the product condition complies with the identified criterion, compliance verification data indicative of whether the product complies with the predefined product standard, and
      provide the compliance verification data to the monitoring system.

* * * * *